United States Patent
Brunner et al.

(10) Patent No.: US 11,326,041 B2
(45) Date of Patent: May 10, 2022

(54) SURFACE-TREATED FILLERS FOR BIAXIALLY ORIENTED POLYESTER FILMS

(71) Applicant: OMYA INTERNATIONAL AG, Oftringen (CH)

(72) Inventors: Martin Brunner, Wallbach (CH); Michael Knerr, Oftringen (CH); Christian Schanzer, Walenstadt (CH); Daniel Ganz, Sattel (CH)

(73) Assignee: OMYA INTERNATIONAL AG, Oftringen (CH)

( * ) Notice: Subject to any disclaimer, the term of this patent is extended or adjusted under 35 U.S.C. 154(b) by 281 days.

(21) Appl. No.: 16/463,251

(22) PCT Filed: Nov. 21, 2017

(86) PCT No.: PCT/EP2017/079931
§ 371 (c)(1),
(2) Date: May 22, 2019

(87) PCT Pub. No.: WO2018/095909
PCT Pub. Date: May 31, 2018

(65) Prior Publication Data
US 2019/0292348 A1 Sep. 26, 2019

(30) Foreign Application Priority Data
Nov. 22, 2016 (WO) ............... PCT/EP2016/078466

(51) Int. Cl.
| B32B 27/08 | (2006.01) |
| B32B 27/20 | (2006.01) |
| B32B 27/36 | (2006.01) |
| C08K 3/26 | (2006.01) |
| C08K 9/04 | (2006.01) |
| C08K 9/06 | (2006.01) |
| C08J 5/18 | (2006.01) |
| C08L 67/02 | (2006.01) |
| B29C 55/12 | (2006.01) |

(52) U.S. Cl.
CPC ............... *C08K 3/26* (2013.01); *B32B 27/08* (2013.01); *B32B 27/20* (2013.01); *B32B 27/36* (2013.01); *C08J 5/18* (2013.01); *C08K 9/04* (2013.01); *C08K 9/06* (2013.01); *B32B 2264/104* (2013.01); *B32B 2307/518* (2013.01); *C08J 2367/02* (2013.01); *C08K 2003/265* (2013.01); *C08K 2201/005* (2013.01)

(58) Field of Classification Search
None
See application file for complete search history.

(56) References Cited

U.S. PATENT DOCUMENTS

| 3,897,519 | A | 7/1975 | Hogberg et al. |
| 4,126,650 | A | 11/1978 | Via et al. |
| 4,350,645 | A | 9/1982 | Kurosaki et al. |
| 4,921,990 | A | 5/1990 | Uphues et al. |
| 5,554,781 | A | 9/1996 | Reierson |
| 6,710,199 | B2 | 3/2004 | Tsuyutani et al. |
| 6,787,575 | B1 | 9/2004 | Fichou et al. |
| 7,297,755 | B2 | 11/2007 | Shelby et al. |
| 7,312,258 | B2 | 12/2007 | Hoppler et al. |
| 8,460,510 | B2 | 6/2013 | Gane et al. |
| 2003/0065205 | A1 | 4/2003 | Tsuyutani et al. |
| 2004/0097616 | A1 | 5/2004 | Hoppler et al. |
| 2006/0115548 | A1 | 6/2006 | Marchante et al. |
| 2007/0071930 | A1 | 3/2007 | Shelby et al. |
| 2012/0031576 | A1 | 2/2012 | Gane et al. |
| 2013/0331493 | A1* | 12/2013 | Yamamura ......... C08J 5/18 524/145 |

FOREIGN PATENT DOCUMENTS

| DE | 4313510 | 10/1994 |
| EP | 0554654 | 8/1993 |
| EP | 0785858 | 7/1997 |
| EP | 1052269 | 11/2000 |
| EP | 1068949 | 1/2001 |
| EP | 1092000 | 4/2001 |
| EP | 1112167 | 7/2001 |
| EP | 1612237 | 1/2006 |
| EP | 2070991 | 6/2009 |
| EP | 2264108 | 12/2010 |
| EP | 2264109 | 12/2010 |
| EP | 2390285 | 11/2011 |
| EP | 2722368 | 4/2014 |
| EP | 2770017 | 8/2014 |
| FR | 2993818 A1 | 1/2014 |

(Continued)

OTHER PUBLICATIONS

Nevalainen, K. et al., "Voiding behaviour and microstructure of a filled polyester film", Materials Chemistry and Physics, vol. 92, No. 2, Aug. 15, 2005, pp. 540-547.

(Continued)

*Primary Examiner* — Sheeba Ahmed
(74) *Attorney, Agent, or Firm* — Sheppard, Mullin, Richter & Hampton LLP

(57) ABSTRACT

A mono or multi-layer biaxially oriented polyester film is described. Also described, is a process for producing the mono or multi-layer biaxially oriented polyester film. Uses of a surface-treated filler material product as a voiding agent in the mono or multi-layer biaxially oriented polyester film, an article that includes the mono or multi-layer biaxially oriented polyester film as well as the use of the mono or multi-layer biaxially oriented polyester film in packaging products are also described. The packaging products can include: paper and glass coverings, insulating materials, solar, marine and aviation applications, science, electronic and acoustic applications, wires, cables, radio frequency identifications, flexible circuits, graphic arts, filter products, cosmetic products, household products, imaging and recording media, or industrial products.

33 Claims, No Drawings

(56) References Cited

FOREIGN PATENT DOCUMENTS

| | | |
|---|---|---|
| JP | H07-331038 | 12/1995 |
| JP | 2011190387 | 9/2011 |
| JP | 2015086241 | 5/2015 |
| WO | 96/11787 | 4/1996 |
| WO | 00/00553 | 1/2000 |
| WO | 00/13879 | 3/2000 |
| WO | 03/033574 | 4/2003 |
| WO | 2008/023076 | 2/2008 |
| WO | 2009/074492 | 6/2009 |
| WO | 2014/100265 | 6/2014 |
| WO | 2016/023937 | 2/2016 |

OTHER PUBLICATIONS

Nevalainen, K. et al., "The microstructure of a polyethylene terephthalate matrix near to a void under uniaxial draw", Materials Chemistry and Physics, vol. 101, No. 1, Jan. 15, 2007, pp. 103-111.
International Search Report and Written Opinion dated Feb. 1, 2018 in corresponding International Patent Application No. PCT/EP2017/079931, filed Nov. 21, 2017, 11 pages.
Office Action dated Feb. 1, 2021 in Indian Patent Application No. 201917018419 and English translation thereof, 7 pages.

\* cited by examiner

SURFACE-TREATED FILLERS FOR BIAXIALLY ORIENTED POLYESTER FILMS

CROSS-REFERENCE TO PRIOR APPLICATIONS

This application is a National Stage of PCT/EP2017/079931, filed Nov. 21, 2017, and designating the United States (published on May 31, 2018, as WO 2018/095909 A1), which claims priority under 35 U.S.C. § 119 to International Patent Application No. PCT/EP2016/078466, filed Nov. 22, 2016, each hereby expressly incorporated by reference in its entirety and each assigned to the assignee hereof.

The present invention relates to a mono or multi-layer biaxially oriented polyester film, a process for producing the mono or multi-layer biaxially oriented polyester film, the use of a surface-treated filler material product as voiding agent in the mono or multi-layer biaxially oriented polyester film, an article comprising the mono or multi-layer biaxially oriented polyester film as well as the use of the mono or multi-layer biaxially oriented polyester film in packaging products, paper and glass coverings, insulating materials, solar, marine and aviation applications, science, electronic and acoustic applications, wires, cables, radio frequency identifications, flexible circuits, graphic arts, filter products, cosmetic products, household products, imaging and recording media, or industrial products.

Biaxially oriented polyester films, such as biaxially oriented polyethylene terephthalate (BOPET) films, which are also known as oriented polyester films, are used in a wide variety of technical applications such as packaging products, paper and glass coverings, insulating materials, solar, marine and aviation applications, science, electronic and acoustic applications, wires, cables, radio frequency identifications, flexible circuits, graphic arts, filter products, cosmetic products, household products, imaging and recording media, or industrial products.

It is well known that low density articles can be produced through the addition of foaming agents (chemical or gas) or voiding agents. For example, shaped article may be microvoided throughout the film by blending in voiding agents, i.e., small amounts of particles or incompatible polymers which form voids on stretching. This process is called "voiding" and may also be referred to as "cavitating" or "microvoiding". Voids are obtained by incorporating about 5 to about 50 wt.-% of small organic or inorganic particles or "inclusions" (referred in the art as "voiding" or "cavitation" agents) into a matrix polymer and orienting the polymer by stretching in at least one direction. During stretching, small cavities or "microvoids" are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. In either case, the creation of small voids/holes in the article leads to a lowering of the density, an increase in the opacity and insulating properties, and inherent UV blocking without the need of a separate UV absorber because of the scattering of light by the voids. Microvoided articles have the added benefit of lower overall film cost and greater ease separation/recyclability, especially where such articles are used in packaging applications such as, for example, as labels (see e.g. U.S. Pat. No. 7,297,755 B2).

In principle, the formation of voids is based on the generation of microcracks at the interface between the polymer and the voiding agent during longitudinal stretching. During subsequent transverse stretching, these fine longitudinal cracks tear open to form air-filled, closed hollow spaces. Hence, it seems plausible that the generation of voids during simultaneous orientation is disproportionately more difficult than during sequential orientation. Indeed, it becomes apparent in practice that the particles incompatible in polypropylene that are common, such as $CaCO_3$ or PBT, do not generate voids at all or generate them only with a selective particle shape or particle size (see e.g. WO03/033574) during simultaneous orientation. For this process, an alternative technology for generating voids by means of foaming agents was therefore developed.

Similar problems are known about the production of voids-containing films made of polyethylene terephthalate. With these films, the generation of voids in a sequential orientation is also technically much more difficult than with polypropylene films. The LISIM process (linear motor simultaneous stretching technology, which is available from Brückner Maschinenbau GmbH & Co. KG, Germany) for producing voids-containing PET films is therefore explicitly not recommended (see e.g. EP 1 068 949).

It is appreciated that voided polyester films typically comprise a blend of polyester polymers and a voiding agent (organic material or inorganic fillers such as calcium carbonate) and are produced by forming a film from said blend by casting or blowing with subsequent stretching or drawing of the film in two orthogonal directions, at two different temperatures.

In the art, several attempts have been made to improve the mechanical and optical properties of polyester films by adding inorganic filler materials and especially calcium carbonate-comprising filler materials. For instance, EP 0 554 654 A1 refers to a polyester resin film, which is biaxially oriented, and, again, oriented in a machine direction, and has a coating layer formed on at least one surface of the film, in which the coating layer contains at least 50% by weight of a water-soluble or water-dispersible polyester resin having a glass transition temperature of at least 20° C. To prevent the adhesion of the coating layer to the heating roll during restretching, the coating layer may contain inorganic or organic particles. Such particles are described as acting to improve the anti-blocking or slipping properties.

Likewise, DE 43 13 510 A1 relates to an oriented, mono or multilayer film having an overall thickness of ≤4 μm and a roughness on at least one film surface of Ra<30 nm, where the surface gas-flow resistance on at least one film surface is t≤ad$^b$ [s], where a=0 to 10 000 [s/μm], b=3.0 to 0, and d (overall film thickness) ≤4 μm. The film may contain first (I) and second (II) particles. The first particles are monodisperse and have an aspect ratio of 1.0-1.2.

EP 1 052 269 A1 refers to a biaxially-oriented film with a thickness of 1-500 μm and with a crystallizable thermoplastic as main component and further containing UV stabilizer(s) and white pigment(s).

EP 1 612 237 A1 refers to a thermoplastic biaxially oriented film containing at least 500 ppm of pigment, at least 20 wt.-% of recycled material of the same type is added. The film can be mono or multi-layer and is preferably 10 to 300 μm thick.

K. Nevalainen et al., "Voiding behaviour and microstructure of a filled polyester film"; Materials Chemistry and Physics 92 (2005) 540-547 refers to the voiding behaviour of a filled polyester film from polyethylene terephthalate.

The utilized filler was barium sulfate which had an average particle size between 1 and 2 µm.

K. Nevalainen et al., "The microstructure of polyethylene terephthalate matrix near to a void under uniaxial draw"; Materials Chemistry and Physics 101 (2007) 103-111 describes the characterization of the matrix immediately adjacent to a void. In particular, it is referred to an uniaxial drawn PET film and the void formed around a spherical 5 µm-sized glass bead filler.

A. Sudár et al., "The mechanism and kinetics of void formation and growth in particulate filled PE composites"; Polymer letters, Vol. 1, No. 11 (2007), 763-772 describes that the formation of voids in PE especially depends on the nature of the matrix, i.e. in soft matrices the number of voids is smaller and their size is larger at the same deformation and filler content than in polymers with larger inherent modulus.

However, the described films have the disadvantage that suitable voids during stretching of biaxially oriented polyester films to create microporous films having a low density and high opacity can be hardly prepared without film breakage during the stretching process.

Thus, the provision of biaxially oriented polyester films having a microporous structure at low density and high opacity remains of interest to the skilled man. Furthermore, it is desired to keep the mechanical and optical properties on a high level and to provide environmentally friendly films, which on the one hand are produced from raw materials that grow back and on the other hand can be disposed in an environmentally friendly manner.

Accordingly, it is an object of the present invention to provide a biaxially oriented polyester film having a microporous structure. It would also be desirable to provide a biaxially oriented polyester film or corresponding layer, having a microporous structure at low density, especially a density being below the density typically achieved for biaxially oriented films or corresponding layers using barium sulfate or titanium dioxide as voiding agents. Thus, it would be desirable to provide a biaxially oriented polyester film or layer having a density of less than 1.4 g/cm$^3$ (especially for PET). It would also be desirable to provide a biaxially oriented polyester film or layer having an opaque appearance. It would be also desirable to provide a biaxially oriented polyester film or layer which can be prepared without film/layer breakage. It would be also desirable to provide a biaxially oriented polyester film or layer having good mechanical and optical properties. It would be also desirable to provide a biaxially oriented polyester film or layer being environmentally friendly, which on the one hand is produced from raw materials that grow back and on the other hand can be disposed in an environmentally friendly manner.

Another object of the present invention is the provision of an inorganic voiding agent for biaxially oriented polyester films or layers. It would also be desirable to provide an inorganic voiding agent for biaxially oriented polyester films or layers, which shows good dispersing properties and compounding performance in polyester film/layer applications. It would also be desirable to provide an inorganic voiding agent for biaxially oriented polyester films or layers, which imparts low density to the film or layer. It would be also desirable to provide an inorganic voiding agent which does not lead to film/layer breakage when preparing the biaxially oriented polyester film or layer. It would also be desirable to provide an inorganic voiding agent for biaxially oriented polyester films or layers, which imparts good mechanical properties such as tensile strength, elongation at break or modulus of elasticity. It would also be desirable to provide an inorganic voiding agent for biaxially oriented polyester films or layers which imparts an opaque appearance to the film or layer. It would also be desirable to provide an inorganic voiding agent for biaxially oriented polyester films or layers, which allows processing into a masterbatch or a compound, using a continuous process. It is also an object of the present invention to provide an inorganic voiding agent for biaxially oriented polyester films or layers, which allows processing into a masterbatch having low filter pressure value.

The foregoing objects and other objects are solved by the subject-matter as defined herein in the independent claims.

According to one aspect of the present invention, a mono or multi-layer biaxially oriented polyester film is provided. The mono or multi-layer biaxially oriented polyester film comprises at least one layer comprising at least one polyester in an amount ranging from 70 to 99.9 wt.-% and a surface-treated filler material product in an amount ranging from 0.1 to 30 wt.-%, based on the total weight of the layer, wherein the surface-treated filler material product comprises A) at least one ground calcium carbonate-comprising filler material having a weight median particle size $d_{50}$ in the range from 0.5 µm to 2.5 µm, and B) a treatment layer on the surface of the at least one ground calcium carbonate-comprising filler material comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v., wherein the surface-treated filler material product comprises the treatment layer in an amount of from 0.1 to 2.3 wt.-%, based on the total dry weight of the at least one ground calcium carbonate-comprising filler material.

According to a further aspect, a process for producing a mono or multi-layer biaxially oriented polyester film, as defined herein, is provided comprising the steps of:

a) providing a composition comprising at least one polyester and a surface-treated filler material product, and b) forming a film from the composition of step a), and c) stretching the film obtained in step b) in machine direction (MD) and transverse direction (TD) in any order, wherein the stretching in machine direction (MD) and transverse direction (TD) is carried out sequential or simultaneously, wherein the surface-treated filler material product comprises A) at least one ground calcium carbonate-comprising filler material having a weight median particle size $d_{50}$ in the range from 0.5 µm to 2.5 µm, and B) a treatment layer on the surface of the at least one ground calcium carbonate-comprising filler material comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v., wherein the surface-treated filler material product comprises the treatment layer in an amount of from 0.1 to 2.3 wt.-%, based on the total dry weight of the at least one ground calcium carbonate-comprising filler material.

According to still another aspect of the present invention, a use of a surface-treated filler material product as voiding agent in a mono or multi-layer biaxially oriented polyester film, as defined herein, is provided, wherein the surface-treated filler material product comprises A) at least one ground calcium carbonate-comprising filler material having a weight median particle size $d_{50}$ in the range from 0.5 μm to 2.5 μm, and B) a treatment layer on the surface of the at least one ground calcium carbonate-comprising filler material comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v., wherein the surface-treated filler material product comprises the treatment layer in an amount of from 0.1 to 2.3 wt.-%, based on the total dry weight of the at least one ground calcium carbonate-comprising filler material.

According to still another aspect of the present invention, an article comprising a mono or multi-layer biaxially oriented polyester film, as defined herein, wherein the article is selected from the group consisting of packaging products, preferably flexible packaging products, food contact applications, paper and glass coverings, insulating materials, solar, preferably photovoltaic front and backsheets, marine and aviation applications, science, electronic and acoustic applications, preferably displays, wires, cables, radio frequency identifications, flexible circuits, graphic arts, preferably labels, paper replacement and holograms, filter products, cosmetic products, household products imaging and recording media, preferably photographic paper, X-ray film and thermal transfer imaging and industrial products, preferably capacitors, release sheets, fiberglass panels, laminating films, hot stamping foils and insulation facing.

According to still another aspect of the present invention, a use of a mono or multi-layer biaxially oriented polyester film, as defined herein, in packaging products, preferably flexible packaging products, food contact applications, paper and glass coverings, insulating materials, solar, preferably photovoltaic front and backsheets, marine and aviation applications, science, electronic and acoustic applications, preferably displays, wires, cables, radio frequency identifications, flexible circuits, graphic arts, preferably labels, paper replacement and holograms, filter products, cosmetic products, household products, imaging and recording media, preferably photographic paper, X-ray film and thermal transfer imaging or industrial products, preferably capacitors, release sheets, fiberglass panels, laminating films, hot stamping foils and insulation facing is provided.

Advantageous embodiments of the present invention are defined herein and also in the corresponding sub-claims.

According to one embodiment of the present invention, the at least one polyester and surface-treated filler material product comprising layer of the film comprises the surface-treated filler material product in an amount ranging from 1 to 28 wt.-%, based on the total weight of the layer, preferably from 2 to 26 wt.-%, more preferably from 3 to 25 wt.-%, even more preferably from 4.5 to 23 wt.-%, and most preferably from 4 to 20 wt.-%.

According to another embodiment the at least one polyester is selected from the group consisting of polyglycolic acid (PGA), polylactic acid (PLA), polycaprolactone (PCL), polyhydroxybutyrate (PHB), polyethylene terephthalate (PET), polybutylene terephthalate (PBT), polytrimethylene terephthalate (PTT), polyethylene naphthalate (PEN), polyethylene furanoate (PEF), bio-based polyesters, PET recycling materials and mixtures thereof.

According to yet another embodiment the at least one polyester and surface-treated filler material product comprising layer of the film comprises the at least one polyester in an amount ranging from 80 to 99.9 wt.-%, more preferably from 80 to 96 wt.-%, based on the total weight of the layer.

According to one embodiment the at least one ground calcium carbonate-comprising filler material is a wet or dry ground calcium carbonate-comprising filler material. It is specifically contemplated or preferred to use wet ground calcium-carbonate-comprising filler materials in relation to the foregoing aspects of the present invention.

According to another embodiment the at least one ground calcium carbonate-comprising filler material is natural ground calcium carbonate, precipitated calcium carbonate, modified calcium carbonate, surface-treated calcium carbonate, or a mixture thereof, and preferably natural ground calcium carbonate.

According to yet another embodiment the at least one ground calcium carbonate-comprising filler material has a) a weight median particle size $d_{50}$ from 0.5 μm to 2 μm, preferably from 0.5 μm to 1.8 μm, and most preferably from 0.6 μm to 1.8 μm, and/or b) a top cut particle size $d_{98}$ of ≤15 μm preferably of ≤10 μm, more preferably of ≤7.5 μm, even more preferably of ≤7 μm and most preferably of ≤6.5 μm, and/or c) a fineness such that at least 15 wt.-%, preferably at least 20 wt.-%, even more preferably at least 25 wt.-% and most preferably from 30 to 40 wt.-% of all particles have a particle size of <0.5 μm, and/or d) a specific surface area (BET) of from 0.5 to 150 m$^2$/g, preferably of from 0.5 to 50 m$^2$/g, more preferably of from 0.5 to 35 m$^2$/g, and most preferably of from 0.5 to 15 m$^2$/g, as measured using nitrogen and the BET method according to ISO 9277.

According to one embodiment the treatment layer on the surface of the at least one ground calcium carbonate-comprising filler material comprises at least one saturated aliphatic linear or branched carboxylic acid and salty reaction products thereof, preferably the at least one saturated aliphatic linear or branched carboxylic acid is selected from the group consisting of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, and/or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof.

According to another embodiment the surface-treated filler material product comprises the treatment layer in an amount of from 0.2 to 2.0 wt.-%, preferably from 0.4 to 1.9 wt.-% and most preferably from 0.5 to 1.8 wt.-%, based on the total dry weight of the at least one ground calcium carbonate-comprising filler material.

According to yet another embodiment the at least one polyester and surface-treated filler material product comprising layer of the film further comprises a thermoplastic polymer, preferably crosslinked with a crosslinking agent, selected from the group consisting of a polyolefin, preferably selected from the group consisting of polypropylene, polyethylene, polybutylene, and mixtures thereof, a cyclic olefin copolymer (COC), a polyketone, a polysulphone, a fluoropolymer, a polyacetal, an ionomer, an acrylic resin, a polystyrene resin, a polyurethane, a polyamide, a polycarbonate, a polyacrylonitrile and a copolymerized resin and mixtures thereof.

According to one embodiment the at least one polyester and surface-treated filler material product comprising layer of the film comprises the thermoplastic polymer in an amount ranging from 0.1 to 29.9 wt.-%, preferably from 1 to 28 wt.-%, more preferably from 2 to 26 wt.-%, even more preferably from 3 to 25 wt.-%, still more preferably from 4.5 to 23 wt.-%, and most preferably from 4 to 20 wt.-%, based on the total weight of the layer.

According to another embodiment the film, preferably the at least one layer comprising the surface-treated filler material product, has a) a density in the range from 0.8 to 1.4 g/cm$^3$, preferably from 0.8 to 1.38 g/cm$^3$, more preferably from 0.85 to 1.35 g/cm$^3$, even more preferably from 0.85 to 1.32 g/cm$^3$ and most preferably from 0.85 to 1.28 g/m$^2$, and/or b) an opacity of ≥50%, preferably of ≥55% and most preferably of ≥60%.

According to yet another embodiment the at least one polyester and surface-treated filler material product comprising layer of the film further comprises an inorganic filler material different from the surface-treated filler material product and preferably selected from the group consisting of alumina, silica, titanium dioxide, alkaline metal salts, such as barium carbonate, calcium sulfate, barium sulfate and mixtures thereof, preferably in an amount of 1 to 10 wt.-% based on the total weight of the layer.

According to one embodiment the film, preferably the at least one polyester and surface-treated filler material product comprising layer, comprises an additive selected from the group consisting of light stabilizers, preferably 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, more preferably the 2-hydroxybenzotriazoles and triazines, most preferably hydroxy-phenyl-triazin, optical brightener, blue dyes, preferably blue dyes soluble in polyester, antiblocking agents, white pigments and mixtures thereof.

According to one embodiment the composition provided in step a) of the inventive process is a masterbatch obtained by mixing and/or kneading the at least one polyester and the surface-treated filler material product to form a mixture and continuously pelletizing the obtained mixture.

According to another embodiment of the process, the masterbatch has a filter pressure value in the range from 0.01 to 0.5 bar/g, preferably from 0.01 to 0.15 bar/g, and most preferably from 0.01 to 0.1 bar/g.

According to still another embodiment of the process the masterbatch comprises the surface-treated filler material product in an amount of from >30 to 85 wt.-%, preferably from 35 to 80 wt.-% and more preferably from 40 to 70 wt.-%, based on the total weight of the masterbatch.

According to one embodiment of the process, process steps a) and b), if the composition provided in step a) is a masterbatch, are carried out simultaneously, preferably in that the at least one polyester and the surface-treated filler material product are added directly into an extruder to carry out step b).

According to another embodiment of the process, the composition comprising at least one polyester and a surface-treated filler material product of step a), if it is a masterbatch, is obtained by adding the surface-treated filler material product, preferably before or after, to the polycondensation process of the at least one polyester.

According to still another embodiment of the process, the composition provided in step a) of the inventive process is a compound obtained by mixing and/or kneading the at least one polyester and the surface-treated filler material product to form a mixture and continuously pelletizing the obtained mixture.

According to one embodiment of the process, the compound has a filter pressure value in the range from 0.01 to 0.5 bar/g, preferably from 0.01 to 0.15 bar/g, and most preferably from 0.01 to 0.1 bar/g.

According to another embodiment of the process, process steps a) and b), if the composition provided in step a) is a compound, are carried out simultaneously, preferably in that the at least one polyester and the surface-treated filler material product are added directly into an extruder to carry out step b).

According to still another embodiment of the process, the composition comprising at least one polyester and a surface-treated filler material product of step a), if it is a compound, is obtained by adding the surface-treated filler material product, preferably before or after, to the polycondensation process of the at least one polyester.

The at least one polyester and the surface-treated filler material product, and, if present, other optional additives, may be mixed by the use of a suitable mixer, e.g. a Henschel mixer, a super mixer, a tumbler type mixer or the like. According to another embodiment, process steps a) and b) are carried out simultaneously, preferably in that the at least one polyester and the surface-treated filler material product are added directly into an extruder to carry out step b). According to yet another embodiment, the composition comprising at least one polyester and a surface-treated filler material product of step a) is obtained by adding the surface-treated filler material product, preferably before or after, to the polycondensation process of the at least one polyester.

It should be understood that for the purposes of the present invention, the following terms have the following meanings:

The term "biaxially oriented" polyester film indicates that the film is a biaxially oriented film, i.e. the film has been subjected to a stretching process in machine direction (MD) and transverse direction (TD) obtaining thereby a biaxially oriented polymer.

A "film" in the meaning of the present invention is a sheet or layer of material having a median thickness which is small compared to its length and width. For example, the term "film" may refer to a sheet or layer of material having a median thickness of from 0.5 to 500 µm, preferably from 4 to 400 µm, more preferably from 5 to 300 µm and most preferably from 6 to 250 µm, e.g. from 8 to 150 µm. The film is in the form of a mono or multi-layer film.

A "monolayer" film refers to a film consisting of one layer only. A "multi-layer" film refers to a film consisting of two or more layers such as two to ten layers, preferably three layers, which are adjacent to each other. If the multi-layer film is a three layer film, the film may have the film structure A-B-A or A-B-C. In the multi-layer film, the core layer is preferably voided.

The term "ground calcium carbonate-comprising filler" in the gist of the present invention means a calcium carbonate-comprising filler which has been manufactured by a process including at least one grinding step. "Ground calcium carbonate-comprising fillers may be "wet ground" or "dry ground", wherein a "wet ground calcium carbonate-comprising filler" in the meaning of the present invention is a ground calcium carbonate comprising filler which has been manufactured by a process including at least one grinding step in aqueous suspension with a solids content between 20 and 80 wt.-% and a "dry ground calcium carbonate-comprising filler" is a ground calcium carbonate comprising filler which has been manufactured by a process including at least one grinding step in aqueous suspension with a solids content of more than 80 and up to 100 wt.-%.

The term "microporous film" or "microporous layer" in the meaning of the present invention refers to a polyester film or a corresponding layer that allows the passage of gases and moisture vapor due to the presence of micropores. The presence of "micropores" of a biaxially oriented polyester film or layer can be measured by its water vapor transmission rate (WVTR), which is specified in g/(m² day). For example, a polymer film or layer may considered as being "microporous" if it has a WVTR of below 100 g/(m²·day). The WVTR may be determined with a Lyssy L80-5000 measuring device according to ASTM E398.

The term "low density" in the meaning of the present invention refers to a mono or multi-layer biaxially oriented polyester film or a corresponding layer having a density from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m².

For the purpose of the present invention, the term "calcium carbonate-comprising filler material" refers to a material that comprises at least 80 wt.-% calcium carbonate, based on the total dry weight of the calcium carbonate-comprising filler material.

"Natural ground calcium carbonate" (GCC) in the meaning of the present invention is a calcium carbonate obtained from natural sources, such as limestone, marble, dolomite or chalk, and processed through a wet treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or EP 2 264 108 A1.

The term "surface-treated filler material product" in the meaning of the present invention refers to a calcium carbonate-comprising filler material which has been contacted with a surface treatment agent such as to obtain a coating layer on at least a part of the surface of the calcium carbonate-comprising filler material.

The term "dry" calcium carbonate-comprising filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapor and isolated using a stream of nitrogen gas (at 100 ml/min) is determined in a Coulometric Karl Fischer unit.

The term "polymer composition" refers to a composite material comprising at least one additive (e.g., at least one filler) and at least one polyester material which may be used in the production of a polymer product.

The term "polymer masterbach" (=or "masterbatch") relates to a composition with a relative high filler content, that means at least or equal to 30 wt.-% (based on the total weight of the composition). A "polymer masterbatch" may be added to an unfilled or lowly filled polyester during processing in order to achieve higher filler contents. Nevertheless, a "polymer composition" (=or "composition") as defined earlier having a relative low filler content, that means below 30 wt.-% (based on the total weight of the composition), and which often also referred to as a "polymer compound" (=or "compound"), may also be used directly in the production of a polymer product. Accordingly, the term "polymer composition" (=composition) as used herein comprises both, "polymer masterbatches" and "polymer compounds".

The term "specific surface area" (in m²/g) of the mineral filler in the meaning of the present invention is determined using the BET method with nitrogen as adsorbing gas, which is well known to the skilled man (ISO 9277:2010). The total surface area (in m²) of the mineral filler is then obtained by multiplying the specific surface area by the mass (in g) of the mineral filler prior to treatment.

Throughout the present document, the "particle size" of a calcium carbonate-comprising filler is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

For the purpose of the present invention, the "solids content" of a liquid composition is a measure of the amount of material remaining after all the solvent or water has been evaporated.

A "suspension" or "slurry" in the meaning of the present invention comprises insoluble solids and water, and optionally further additives, and usually contains large amounts of solids and, thus, is more viscous and can be of higher density than the liquid from which it is formed.

A "treatment layer" in the gist of the present invention refers to a layer, preferably a monolayer of a surface treatment agent on the surface of the at least one ground calcium carbonate-comprising filler material. The "treatment layer" comprises as surface treatment agent i.e. i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive mono or multi-layer biaxially oriented polyester film comprises at least one layer comprising at least one polyester in an amount ranging from 70 to 99.9 wt.-% and a surface-treated filler material product in an amount ranging from 0.1 to 30 wt.-%, based on the total weight of the film. The surface-treated filler material product comprises (A) at least one ground calcium carbonate-comprising filler material having a weight median particle size $d_{50}$ in the range from 0.5 μm to 2.5 μm, and (B) a treatment layer on the surface of the at least one ground calcium carbonate-comprising filler material comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v. The surface-treated filler material product comprises the treatment layer in an amount of from 0.1 to 2.3 wt.-%, based on the total dry weight of the at least one ground calcium carbonate-comprising filler material.

In the following details and preferred embodiments of the inventive product will be set out in more detail. It is to be understood that these technical details and embodiments also apply to the inventive process for producing said mono or multi-layer biaxially oriented polyester film and the inventive use of the mono or multi-layer biaxially oriented polyester film and the surface-treated filler material product.

Polyester

The mono or multi-layer biaxially oriented polyester film of the present invention comprises at least one layer comprising at least one polyester. It is appreciated that the at least one polyester is not restricted to a specific material as long as the polymer is suitable for the preparation of a mono or multi-layer biaxially oriented polyester film. The skilled person will select the polyester in accordance with the desired application of the mono or multi-layer biaxially oriented polyester film.

It is one requirement of the present invention that the at least one polyester and the surface-treated filler material product are present in the same layer. Thus, the surface-treated filler material product is dispersed in the at least one polyester.

Accordingly, a multi-layer biaxially oriented polyester film comprises at least one layer comprising the at least one polyester and the surface-treated filler material product. If the multi-layer biaxially oriented polyester film comprises two or more polyester and surface-treated filler material product comprising layers, it is appreciated that the two or more layers may be the same or different, e.g. may differ in the amounts of the at least one polyester and the surface-treated filler material product.

It is appreciated that the expression "at least one" polyester means that the polyester comprises, preferably consists of, one or more kinds of polyester(s).

Accordingly, it should be noted that the at least one polyester may be one kind of polyester. Alternatively, the at least one polyester may be a mixture of two or more kinds of polyesters. For example, the at least one polyester may be a mixture of two or three kinds of polyesters, like two kinds of polyester.

In one embodiment of the present invention, the at least one polyester comprises, preferably consists of, one kind of polyester.

In general, the term "polyester" means a polymer obtained by the condensation polymerization, at least in part, of a diol and a dicarboxylic acid. As the dicarboxylic acid, terephthalic acid, isophthalic acid, phthalic acid, naphthalenedicarboxylic acid, adipic acid, or sebacic acid can be used. As the diol, ethylene glycol, trimethylene glycol, tetramethylene glycol, or cyclohexanedimethanol can be used.

Additionally or alternatively, the at least one polyester may be a partially or fully biobased polyester, i.e. a polyester in which the monomers are derived from renewable biomass sources. Examples of monomers include those which can be produced by using bioderived compounds. For example, the monomers include but are not limited to ethylene glycol (EG), furandicarboxylic acid (FDCA), polyethylene furanoate (PEF), which can be produced by using fructose, and mixtures thereof. Further monomers which are suitable for preparing the biobased polyester are described in e.g. WO2014/100265 A1, which is thus herewith incorporated by reference.

Additionally or alternatively, the at least one polyester is a PET recycling material such as PET bottle scrap from the PET recycling stream.

Thus, the inventive polyester is preferably polyglycolic acid, polylactic acid, polycaprolactone, polyhydroxybutyrate (PHB), polyethylene terephthalate, polytrimethylene terephthalate, polybutylene terephthalate, poly(1,4-cyclohexanedimethylene terephthalate), polyethylene naphthalene-2,6-dicarboxylate, polyethylene naphthalene-1,5-dicarboxylate, polytrimethylene naphthalate, polyethylene naphthalate/bibenzoate, or another combination derived from the monomers mentioned above, or else a mixture of these polyesters. For example, polyesters that may be used are selected from the group consisting of polyglycolic acid (PGA), polylactic acid (PLA), polycaprolactone (PCL), polyhydroxybutyrate (PHB), polyethylene terephthalate (PET), polybutylene terephthalate (PBT), polytrimethylene terephthalate (PTT), polyethylene naphthalate (PEN), polyethylene furanoate (PEF), bio-based polyesters, PET recycling materials and mixtures thereof.

Preference is given to polyethylene terephthalate (PET) and polyethylene naphthalate (PEN), polyethylene furanoate (PEF) and mixtures thereof. Most preferably, the at least one polyester is polyethylene terephthalate (PET).

These polyesters may be either a homopolymer or copolymer. As a component to be copolymerized, a diol component such as diethylene glycol, neopentyl glycol or polyalkylene glycol and a dicarboxylic acid such as adipic acid, sebacic acid, phthalic acid, isophthalic acid or 2,6-naphthalenedicarboxylic acid can be used.

In a preferred embodiment, the polyester also contains at least 0.5 wt.-%, preferably at least 1 wt.-% and more preferably at least 2 wt.-% based on the total weight of the polyester, of units originated from the monomer isophthalic acid by condensation with a diol.

The inventive polyester preferably has an intrinsic viscosity measured according to ISO 1628-1 (at 135° C. in decalin) 0.5 to 1.4 dl/g, more preferably from 0.65 to 1.0 dl/g and most preferably from 0.65 to 0.85 dl/g. For example, the inventive polyester has an intrinsic viscosity measured according to ISO 1628-1 (at 135° C. in decalin) 0.78 to 0.82 dl/g.

In one embodiment, the polyester has a crystallization temperature (Tc) measured by differential scanning calorimetry (DSC) of at least 120° C., preferably of at least 140° C., e.g. in the range from 140 to 180° C.

Additionally or alternatively, the polyethylene terephthalate (PET) preferably comprises diethylene glycol in an amount of $\leq 3$ wt.-%, more preferably of $\leq 1.5$ wt.-% and most preferably of $\leq 1.2$ wt.-%, based on the total weight of the polyethylene terephthalate (PET).

It is appreciated that the at least one polyester is preferably amorphous or crystalline polyester, for example crystalline polyethylene terephthalate (PET).

The at least one polyester and surface-treated filler material product comprising layer of the mono or multi-layer biaxially oriented polyester film comprises the at least one polyester in an amount ranging from 70 to 99.9 wt.-%, based on the total weight of the layer.

According to one embodiment, the at least one polyester and surface-treated filler material product comprising layer of the mono or multi-layer biaxially oriented polyester film comprises the at least one polyester in an amount ranging from 80 to 99.9 wt.-%, more preferably from 80 to 96 wt.-%, based on the total weight of the layer.

In case the at least one layer of the mono or multi-layer biaxially oriented polyester film further comprises a thermoplastic polymer, the at least one polyester and surface-treated filler material product comprising layer of the film comprises the at least one polyester in an amount ranging from 70 to 99.8 wt.-%, preferably from 80 to 99.8 wt.-%, more preferably from 80 to 96 wt.-%, based on the total weight of the layer.

Surface-Treated Filler Material Product

The at least one layer of the mono or multi-layer biaxially oriented polyester film of the present invention also comprises a surface-treated filler material product, wherein the surface-treated filler material product comprises at least one ground calcium carbonate-comprising filler material. The surface-treated filler material product has several essential features, which are defined in claim 1 and will be described in more detail in the following.

The at least one ground calcium carbonate-comprising filler material is a wet or dry ground calcium carbonate-comprising filler material. Preferably, the at least one ground calcium carbonate-comprising filler material is a wet ground calcium carbonate-comprising filler material.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulverizer, a shredder, a de-clumper, a knife cutter, or other such equipment known to the skilled man.

In case the at least one ground calcium carbonate-comprising filler material is a wet ground calcium carbonate-comprising filler material, the wet grinding step may be performed under conditions such that autogenous grinding takes place and/or by horizontal ball milling, and/or other such processes known to the skilled man. The processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the wet ground calcium carbonate-comprising filler material in order to reduce the associated moisture content to a level which is not greater than about 0.5 wt.-%, based on the total dry weight of the at least one wet ground calcium carbonate-comprising filler material. The residual total moisture content of the filler can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one wet ground calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one wet ground calcium carbonate-comprising filler material is subjected to a beneficiation step (such as a flotation, bleaching or magnetic separation step) to remove impurities.

In another preferred embodiment, the at least one ground calcium carbonate-comprising filler material is a material being ground in a horizontal ball mill, and subsequently dried by using the well-known process of spray drying.

The at least one ground calcium carbonate-comprising filler material in the meaning of the present invention refers to a filler material selected from among natural ground calcium carbonate (GCC), precipitated calcium carbonate (PCC), modified calcium carbonate (MCC), surface-treated calcium carbonate, or mixtures thereof.

According to a preferred embodiment, the at least one ground calcium carbonate-comprising filler material is a natural ground calcium carbonate (GCC), more preferably the ground calcium carbonate-carbonate comprising filler is a wet ground natural calcium carbonate.

GCC is understood to be a naturally occurring form of calcium carbonate, mined from sedimentary rocks such as limestone or chalk, or from metamorphic marble rocks and processed through a treatment such as grinding, screening and/or fractionizing in wet form, for example by a cyclone or classifier. In one embodiment of the present invention, the GCC is selected from the group comprising marble, chalk, dolomite, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulfuric acid, hydrochloric acid, phosphoric acid, citric acid, oxalic acid, or a mixture thereof. In a next step, the calcium carbonate is treated with gaseous carbon dioxide. If a strong acid such as sulfuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1.

In one preferred embodiment, the at least one ground calcium carbonate-comprising filler material is marble, more preferably a wet ground marble.

It is appreciated that the amount of ground calcium carbonate in the at least one calcium carbonate-comprising filler material is at least 80 wt.-%, e.g. at least 95 wt.-%, preferably between 97 and 100 wt.-%, more preferably between 98.5 and 99.95 wt.-%, based on the total dry weight of the at least one ground calcium carbonate-comprising filler material.

The at least one ground calcium carbonate-comprising filler material is preferably in the form of a particulate material, and may have a particle size distribution as conventionally employed for the material(s) involved in the type of product to be produced. In general, it is one specific requirement of the present invention that the at least one ground calcium carbonate-comprising filler material has a weight median particle size $d_{50}$ value in the range from 0.5 to 2.5 µm. For example, the at least one ground calcium carbonate-comprising filler material has a weight median particle size $d_{50}$ from 0.5 µm to 2 µm, preferably from 0.5 µm to 1.8 µm, and most preferably from 0.6 µm to 1.8 µm, such as of about 0.8 µm or about 1.7 µm.

It is preferred that the at least one ground calcium carbonate-comprising filler material has a top cut ($d_{98}$) of ≤15 µm. For example, the at least one ground calcium carbonate-comprising filler material has a top cut ($d_{98}$) of ≤10 µm, preferably of ≤7.5 µm, more preferably of ≤7 µm and most preferably of ≤6.5 µm.

It is appreciated that the weight median particle size $d_{50}$ value and the top cut ($d_{98}$) of the at least one ground calcium carbonate-comprising filler material fulfil a specific ratio. For example, the at least one ground calcium carbonate-comprising filler material has a ratio of weight median particle size $d_{50}$ value and the top cut ($d_{98}$) [$d_{50}/d_{98}$] of from 0.1 to 0.4, preferably from 0.1 to 0.3 and most preferably from 0.2 to 0.3.

Additionally or alternatively, the at least one ground calcium carbonate-comprising filler material has a fineness such that at least 15 wt.-%, preferably at least 20 wt.-%, even more preferably at least 25 wt.-% and most preferably from 30 to 40 wt.-% of all particles have a particle size of <0.5 µm.

In one embodiment, the at least one ground calcium carbonate-comprising filler material has i) a weight median particle size $d_{50}$ from 0.5 to 2.5 µm, preferably from 0.5 µm to 2 µm, more preferably from 0.5 µm to 1.8 µm, and most preferably from 0.6 µm to 1.8 µm, and ii) a top cut particle size $d_{98}$ of ≤15 µm preferably of ≤10 µm, more preferably of ≤7.5 µm, even more preferably of ≤7 µm and most preferably of ≤6.5 µm, and iii) a fineness such that at least 15 wt.-%, preferably at least 20 wt.-%, even more preferably at least 25 wt.-% and most preferably from 30 to 40 wt.-% of all particles have a particle size of <0.5 μm.

For example, the at least one ground calcium carbonate-comprising filler material has
i) a weight median particle size $d_{50}$ from 0.6 μm to 1.8 μm, and
ii) a top cut ($d_{98}$) of ≤6.5 μm, and
iii) a fineness such that 30 to 40 wt.-% of all particles have a particle size of <0.5 μm.

It is further appreciated that the at least one ground calcium carbonate-comprising filler material preferably has a BET specific surface area of from 0.5 and 150 m²/g, as measured using nitrogen and the BET method according to ISO 9277. For example, the at least one ground calcium carbonate-comprising filler material has a specific surface area (BET) of from 0.5 to 50 m²/g, more preferably of from 0.5 to 35 m²/g and most preferably of from 0.5 to 15 m²/g, as measured using nitrogen and the BET method according to ISO 9277.

In one embodiment of the present invention, the at least one ground calcium carbonate-comprising filler material is preferably a marble having a median particle size diameter $d_{50}$ value from 0.5 to 2.5 μm, preferably from 0.5 μm to 2 μm, more preferably from 0.5 μm to 1.8 μm, and most preferably from 0.6 μm to 1.8 μm, such as of about 0.8 μm or about 1.7 μm. In this case, the at least one ground calcium carbonate-comprising filler material exhibits a BET specific surface area of from 0.5 to 150 m²/g, preferably of from 0.5 to 50 m²/g, more preferably of from 0.5 to 35 m²/g and most preferably of from 0.5 to 15 m²/g, measured using nitrogen and the BET method according to ISO 9277.

According to the present invention the at least one ground calcium carbonate-comprising filler material has a residual moisture content of ≤1 wt.-%, based on the total dry weight of the at least one ground calcium carbonate-comprising filler material. Depending on the at least one ground calcium carbonate-comprising filler material, the at least one ground calcium carbonate-comprising filler material has a residual total moisture content of from 0.01 to 1 wt.-%, preferably from 0.01 to 0.2 wt.-%, more preferably from 0.02 to 0.15 wt.-% and most preferably from 0.04 to 0.15 wt.-%, based on the total dry weight of the at least one ground calcium carbonate-comprising filler material.

For example, in case a ground and spray dried marble is used as the at least one ground calcium carbonate-comprising filler material, the residual total moisture content of the at least one ground calcium carbonate-comprising filler material is preferably of from 0.01 to 0.1 wt.-%, more preferably from 0.02 to 0.08 wt.-% and most preferably from 0.04 to 0.07 wt.-% based on the total dry weight of the at least one ground calcium carbonate-comprising filler material. If a PCC is used as the at least one ground calcium carbonate-comprising filler material, the residual total moisture content of the at least one ground calcium carbonate-comprising filler material is preferably of from 0.01 to 0.2 wt.-%, more preferably from 0.05 to 0.17 wt.-% and most preferably from 0.05 to 0.10 wt.-%, based on the total dry weight of the at least one ground calcium carbonate-comprising filler material.

According to the present invention the surface-treated filler material product further comprises a treatment layer on the surface of the at least one ground calcium carbonate-comprising filler material.

The treatment layer comprises
i. a phosphoric acid ester blend of one or more phosphoric acid mono-ester and salty reaction products thereof and/or one or more phosphoric acid di-ester and salty reaction products thereof, and/or
ii. at least one saturated aliphatic linear or branched carboxylic acid and salty reaction products thereof, and/or
iii. at least one aliphatic aldehyde and/or salty reaction products thereof, and/or
iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or
v. at least one polydialkylsiloxane, and/or
vi. mixtures of the materials according to i. to v.

According to one embodiment of the present invention, the surface-treated filler material product comprises a treatment layer on at least a part of the surface of the at least one ground calcium carbonate-comprising filler material, wherein the treatment layer comprises a phosphoric acid ester blend of one or more phosphoric acid mono-ester and salty reaction products thereof and/or one or more phosphoric acid di-ester and salty reaction products thereof.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "salty reaction products of a phosphoric acid ester blend of one or more phosphoric acid mono-esters and/or one or more phosphoric acid di-esters" in the meaning of the present invention refers to products obtained by contacting a calcium carbonate-comprising filler material with one or more phosphoric acid mono-ester and one or more phosphoric acid di-ester and optionally phosphoric acid. Said salty reaction products are formed between the applied one or more phosphoric acid mono-ester and one or more phosphoric acid di-ester and optionally phosphoric acid and reactive molecules located at the surface of the filler material, preferably the at least one ground calcium carbonate-comprising filler material.

Alkyl esters of phosphoric acid are well known in the industry especially as surfactants, lubricants and antistatic agents (Die Tenside; Kosswig and Stache, Carl Hanser Verlag München, 1993).

The synthesis of alkyl esters of phosphoric acid by different methods and the surface treatment of minerals with alkyl esters of phosphoric acid are well known by the skilled man, e.g. from Pesticide Formulations and Application Systems: 15th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from C6 to C30 in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the surface of the calcium carbonate-comprising filler material comprises a phosphoric acid ester blend of one phosphoric acid mono-ester and salty reaction products thereof and one phosphoric acid di-ester and salty reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

If at least a part of the surface of the at least one ground calcium carbonate-comprising filler material comprises a phosphoric acid ester blend of one phosphoric acid mono-ester and salty reaction products thereof and one phosphoric acid di-ester and salty reaction products thereof, it is appreciated that the alcohol substituent of the one phosphoric acid mono-ester and the one phosphoric acid di-ester are preferably the same. For example, at least a part of the surface of the at least one ground calcium carbonate-comprising filler material comprises a phosphoric acid ester blend of 2-ethylhexyl phosphoric acid mono-ester and salty reaction products thereof and 2-ethylhexyl phosphoric acid di-ester and salty reaction products thereof. Alternatively, at least a part of the surface of the at least one ground calcium carbonate-comprising filler material comprises a phosphoric acid ester blend of 2-octyl-1-decyl phosphoric acid mono-ester and salty reaction products thereof and 2-octyl-1-decyl phosphoric acid di-ester and salty reaction products thereof. Alternatively, at least a part of the surface of the at least one ground calcium carbonate-comprising filler material comprises a phosphoric acid ester blend of hexadecyl phosphoric acid mono-ester and salty reaction products thereof and hexadecyl phosphoric acid di-ester and salty reaction products thereof. Alternatively, at least a part of the surface of the at least one ground calcium carbonate-comprising filler material comprises a phosphoric acid ester blend of octadecyl phosphoric acid mono-ester and salty reaction products thereof and octadecyl phosphoric acid di-ester and salty reaction products thereof. Alternatively, at least a part of the surface of the at least one ground calcium carbonate-comprising filler material comprises a phosphoric acid ester blend of 2-octyl-1-dodecylphosphoric acid mono-ester and salty reaction products thereof and 2-octyl-1-dodecylphosphoric acid di-ester and salty reaction products thereof.

In one embodiment of the present invention, at least a part of the surface of the at least one ground calcium carbonate-comprising filler material comprises a phosphoric acid ester blend of two or more phosphoric acid mono-esters and salty reaction products thereof and two or more phosphoric acid di-ester and salty reaction products thereof. In this case, the two or more phosphoric acid mono-esters are selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester and 2-octyl-1-dodecylphosphoric acid mono-ester, the two or more phosphoric acid di-ester are selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester and 2-octyl-1-dodecylphosphoric acid di-ester.

In one embodiment of the present invention, at least a part of the surface of the at least one ground calcium carbonate-comprising filler material comprises a phosphoric acid ester blend of two phosphoric acid mono-esters and salty reaction products thereof and two phosphoric acid di-esters and salty reaction products thereof. For example, at least a part of the surface of the at least one ground calcium carbonate-comprising filler material comprises a phosphoric acid ester blend of hexadecyl phosphoric acid mono-ester, octadecyl phosphoric acid mono-ester, hexadecyl phosphoric acid di-ester, octadecyl phosphoric acid di-ester and salty reaction products thereof and salty reaction products thereof.

According to one embodiment of the present invention, the phosphoric acid ester blend on at least a part of the surface of the at least one ground calcium carbonate-comprising filler material comprises the one or more phosphoric acid mono-ester and salty reaction products thereof to the one or more phosphoric acid di-ester and salty reaction products thereof in a specific molar ratio. In particular, the molar ratio of the one or more phosphoric acid mono-ester and salty reaction products thereof to the one or more phosphoric acid di-ester and salty reaction products thereof in the treatment layer and/or the phosphoric acid ester blend can be from 1:1 to 1:100.

The wording "molar ratio of the one or more phosphoric acid mono-ester and salty reaction products thereof to the one or more phosphoric acid di-ester and salty reaction products thereof" in the meaning of the present invention refers to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof.

According to one embodiment the molar ratio of the one or more phosphoric acid mono-ester and salty reaction products thereof to the one or more phosphoric acid di-ester and salty reaction products thereof in the phosphoric acid ester blend is from 1:1 to 1:100, preferably from 1:1.1 to 1:80, more preferably from 1:1.1 to 1:60, even more preferably from 1:1.1 to 1:40, still even more preferably from 1:1.1 to 1:20, and most preferably from 1:1.1 to 1:10.

Additionally or alternatively, the phosphoric acid ester blend of the treatment layer comprises the one or more phosphoric acid mono-ester and salty reaction products thereof in an amount of from 1 to 50 mol.-%, based on the molar sum of the one or more phosphoric acid mono-ester and salty reaction products thereof and the one or more phosphoric acid di-ester and salty reaction products thereof. For example, the phosphoric acid ester blend of the treatment layer comprises the one or more phosphoric acid mono-ester and salty reaction products thereof in an amount of from 10 to 45 mol.-%, based on the molar sum of the one or more phosphoric acid mono-ester and salty reaction products thereof and the one or more phosphoric acid di-ester and salty reaction products thereof.

According to one embodiment of the present invention,
I) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent, and/or
II) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20, and most preferably from C8 to C18 in the alcohol substituent.

In one embodiment of the present invention, the phosphoric acid ester blend of the treatment layer further comprises one or more phosphoric acid tri-ester and/or phosphoric acid and salty reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the surface of the at least one ground calcium carbonate-comprising filler material.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

In one embodiment of the present invention, the one or more phosphoric acid tri-ester consists of an o-phosphoric acid molecule esterified with three alcohols selected from the same or different, unsaturated or saturated, branched or linear, aliphatic or aromatic alcohols having a total amount of carbon atoms from C6 to C30 in the alcohol substituent. For example, the one or more phosphoric acid tri-ester consists of an o-phosphoric acid molecule esterified with three alcohols selected from the same or different, unsaturated or saturated, branched or linear, aliphatic or aromatic fatty alcohols having a total amount of carbon atoms from C8 to C22, more preferably from C8 to C20 and most preferably from C8 to C18 in the alcohol substituent.

It is appreciated that the three alcohols used for esterifying the phosphoric acid may be independently selected from unsaturated or saturated, branched or linear, aliphatic or aromatic alcohols having a total amount of carbon atoms from C6 to C30 in the alcohol substituent. In other words, the one or more phosphoric acid tri-ester molecule may comprise three substituents being derived from the same alcohols or the phosphoric acid tri-ester molecule may comprise three substituents being derived from different alcohols.

In one embodiment of the present invention, the one or more phosphoric acid tri-ester consists of an o-phosphoric acid molecule esterified with three alcohols selected from the same or different, saturated and linear or branched and aliphatic alcohols having a total amount of carbon atoms from C6 to C30 in the alcohol substituent. For example, the one or more phosphoric acid tri-ester consists of an o-phosphoric acid molecule esterified with three alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid tri-ester consists of an o-phosphoric acid molecule esterified with three alcohols selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid tri-ester consists of an o-phosphoric acid molecule esterified with three alcohols selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid tri-ester is selected from the group comprising hexyl phosphoric acid tri-ester, heptyl phosphoric acid tri-ester, octyl phosphoric acid tri-ester, 2-ethylhexyl phosphoric acid tri-ester, nonyl phosphoric acid tri-ester, decyl phosphoric acid tri-ester, undecyl phosphoric acid tri-ester, dodecyl phosphoric acid tri-ester, tetradecyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

For example, the one or more phosphoric acid tri-ester is selected from the group comprising 2-ethylhexyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

In one embodiment of the present invention, at least a part of the surface of the at least one ground calcium carbonate-comprising filler material comprises a phosphoric acid ester blend of one or more phosphoric acid mono-ester and salty reaction products thereof and one or more phosphoric acid di-ester and salty reaction products thereof and one or more phosphoric acid tri-ester and optionally phosphoric acid and salty reaction products thereof. For example, at least a part of the surface of the at least one ground calcium carbonate-comprising filler material comprises a phosphoric acid ester blend of the one or more phosphoric acid mono-ester and salty reaction products thereof and one or more phosphoric acid di-ester and salty reaction products thereof and one or more phosphoric acid tri-ester and phosphoric acid and salty reaction products thereof.

Alternatively, at least a part of the surface of the at least one ground calcium carbonate-comprising filler material comprises a phosphoric acid ester blend of the one or more phosphoric acid mono-ester and salty reaction products thereof and one or more phosphoric acid di-ester and salty reaction products thereof and optionally phosphoric acid and salty reaction products thereof. For example, at least a part of the surface of the at least one ground calcium carbonate-comprising filler material comprises a phosphoric acid ester blend of the one or more phosphoric acid mono-ester and salty reaction products thereof and one or more phosphoric acid di-ester and salty reaction products thereof and phosphoric acid and salty reaction products thereof.

If at least a part of the surface of the at least one ground calcium carbonate-comprising filler material comprises a phosphoric acid ester blend comprising one or more phosphoric acid tri-ester, it is preferred that the phosphoric acid ester blend comprises the one or more phosphoric acid tri-ester in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the one or more phosphoric acid tri-ester in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

Additionally or alternatively, if at least a part of the surface of the at least one ground calcium carbonate-comprising filler material comprises a phosphoric acid ester blend comprising phosphoric acid and salty reaction products thereof, it is preferred that the phosphoric acid ester blend comprises the phosphoric acid and salty reaction products thereof in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the phosphoric acid and salty reaction products thereof in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

If the phosphoric acid ester blend further comprises phosphoric acid and salty reaction products thereof and one or more phosphoric acid tri-ester, it is thus preferred that the molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester in the phosphoric acid ester blend is ≤10 mol.-%:≤40 mol.-%:≥40 mol.%:≤10 mol.-%, based on the molar sum of the one or more phosphoric acid mono-ester and salty reaction products thereof and the one or more phosphoric acid di-ester and salty reaction products thereof and the one or more phosphoric acid tri-ester and the phosphoric acid and salty reaction products thereof.

The wording "molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester" in the meaning of the present invention refers to the sum of the molecular weight of the phosphoric acid and the sum of the molecular weight of the phosphoric acid molecules in the salty reaction products thereof to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof to the sum of the molecular weight of the phosphoric acid tri-ester molecules. It is appreciated that the phosphoric acid ester blend may comprise salty reaction products obtained from contacting the at least one filler material, preferably the at least one ground calcium carbonate-comprising filler material, with the one or more phosphoric acid mono-ester and one or more phosphoric acid di-ester and optionally phosphoric acid. In such a case, the phosphoric acid ester blend preferably comprises salty reaction products such as one or more calcium, magnesium and/or aluminum salts of phosphoric acid mono-esters and one or more calcium, magnesium and/or aluminum salts of phosphoric acid di-ester and optionally one or more calcium, magnesium and/or aluminum salts of phosphoric acid. Preferably, the phosphoric acid ester blend comprises salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid.

In one embodiment of the present invention, the one or more phosphoric acid mono-ester and/or the one or more phosphoric acid di-ester and optionally the phosphoric acid may be at least partially neutralized by one or more hydroxides of a mono and/or bi and/or trivalent cation and/or one or more salts of a weak acid of a mono and/or bi and/or trivalent cation before the at least one filler material, preferably the at least one ground calcium carbonate-comprising filler material, is prepared. The one or more hydroxides of a bi and/or trivalent cation may be selected from $Ca(OH)_2$, $Mg(OH)_2$, $Al(OH)_3$ and mixtures thereof.

Additionally or alternatively, if the one or more phosphoric acid mono-ester and/or the one or more phosphoric acid di-ester and optionally the phosphoric acid is at least partially neutralized by one or more hydroxides and/or one or more salts of a weak acid of a monovalent cation, the amount of monovalent cations is preferably ≤10 mol.-%, based on the molar sum of acidic groups in the one or more phosphoric acid mono-ester and the one or more phosphoric acid di-ester and optionally the phosphoric acid, the one or more hydroxide and/or the one or more salt of a weak acid of a monovalent cation to neutralize may be selected from LiOH, NaOH, KOH, $Na_2CO_3$, $Li_2CO_3$, $K_2CO_3$ and mixtures thereof.

In one embodiment of the present invention, the bivalent cations used for the partial neutralization of the one or more phosphoric acid mono-ester and/or the one or more phosphoric acid di-ester and optional the phosphoric acid are derived from salts of weak acids of such cations, preferably from carbonates and/or borates, such as calcium carbonate.

The term "weak acid" in the meaning of the present application refers to a Brønsted-Lowry acid, i.e. an $H_3O^+$-ion provider, featuring a $pK_a$ of >2, preferably from 4 to 7.

Accordingly, the phosphoric acid ester blend of the treatment layer may further comprise salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid. Additionally or alternatively, the phosphoric acid ester blend of the treatment layer further comprises salty reaction products such as one or more aluminum salts of phosphoric acid mono-esters and one or more aluminum salts of phosphoric acid di-ester and optionally one or more aluminum salts of phosphoric acid. Additionally or alternatively, the phosphoric acid ester blend of the treatment layer further comprises salty reaction products such as one or more lithium salts of phosphoric acid mono-esters and one or more lithium salts of phosphoric acid di-ester and optionally one or more lithium salts of phosphoric acid. Additionally or alternatively, the phosphoric acid ester blend of the treatment layer further comprises salty reaction products such as one or more sodium salts of phosphoric acid mono-esters and one or more sodium salts of phosphoric acid di-ester and optionally one or more sodium salts of phosphoric acid. Additionally or alternatively, the phosphoric acid ester blend of the treatment layer further comprises salty reaction products such as one or more potassium salts of phosphoric acid mono-esters and one or more potassium salts of phosphoric acid di-ester and optionally one or more potassium salts of phosphoric acid.

If the one or more phosphoric acid mono-ester and/or the one or more phosphoric acid di-ester and optionally the phosphoric acid is at least partially neutralized by one or more hydroxides and/or one or more salts of a weak acid of a monovalent cation, the treatment layer and/or the phosphoric acid ester blend preferably comprises an amount of monovalent cations of ≤10 mol.-%, based on the molar sum of acidic groups in the one or more phosphoric acid mono-ester and the one or more phosphoric acid di-ester and optionally the phosphoric acid.

In one embodiment of the present invention, the phosphoric acid ester blend of the treatment layer may further comprise additional surface treatment agents that do not correspond to the one or more phosphoric acid mono-ester, one or more phosphoric acid di-ester and the optional one or more phosphoric acid tri-ester and/or phosphoric acid of the present invention.

In one embodiment, the molar ratio of the one or more phosphoric acid mono-ester and/or the one or more phosphoric acid di-ester to the salty reaction products thereof is from 99.9:0.1 to 0.1:99.9, preferably from 70:30 to 90:10.

The wording "molar ratio of the one or more phosphoric acid mono-ester and/or the one or more phosphoric acid di-ester to the salty reaction products thereof" in the meaning of the present invention refers to the sum of the molecular weight of the phosphoric acid mono-ester molecules and/or the sum of the molecular weight of the phosphoric acid di-ester molecules to the sum of the molecular weight of the phosphoric acid mono-ester molecules in the salty reaction products thereof and/or the sum of the phosphoric acid di-ester molecules in the salty reaction products thereof.

Methods for preparing the surface-treated filler material product treated with at least one phosphoric acid ester blend and suitable compounds for coating are described e.g. in EP 2 770 017 A1, which is thus incorporated herewith by reference.

According to another embodiment of the present invention, the surface-treated filler material product comprises a treatment layer on at least a part of the surface of the at least one ground calcium carbonate-comprising filler material, wherein the treatment layer comprises at least one saturated aliphatic linear or branched carboxylic acid and salty reaction products thereof.

For example, the treatment layer comprises a saturated aliphatic linear or branched carboxylic acid having a total amount of carbon atoms from C4 to C24 and/or salty reaction products thereof.

The term "salty reaction products" of the saturated aliphatic linear or branched carboxylic acid in the meaning of the present invention refers to products obtained by contacting the at least one ground calcium carbonate-comprising filler material with the at least one saturated aliphatic linear or branched carboxylic acid. Said reaction products are formed between at least a part of the applied at least one saturated aliphatic linear or branched carboxylic acid and reactive molecules located at the surface of the at least one ground calcium carbonate-comprising filler material.

The aliphatic carboxylic acid in the meaning of the present invention may be selected from one or more linear chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of octanoic acid, myristic acid, palmitic acid, stearic acid and mixtures thereof.

For example, the aliphatic linear or branched carboxylic acid is octanoic acid or stearic acid. Preferably, the aliphatic linear or branched carboxylic acid is stearic acid.

In one embodiment, the molar ratio of the at least one saturated aliphatic linear or branched carboxylic acid to the salty reaction product(s) thereof is from 99.9:0.1 to 0.1:99.9, preferably from 70:30 to 90:10.

The wording "molar ratio of the at least one saturated aliphatic linear or branched carboxylic acid to the salty reaction product(s) thereof" in the meaning of the present invention refers to the sum of the molecular weight of the saturated aliphatic linear or branched carboxylic acid to the sum of the molecular weight of the saturated aliphatic linear or branched carboxylic acid in the salty reaction products.

According to another embodiment of the present invention, the surface treated filler material comprises a treatment layer on at least a part of the surface of the at least one ground calcium carbonate-comprising filler material, wherein the treatment layer comprises at least one aliphatic aldehyde and/or salty reaction products thereof.

In this regard, the at least one aliphatic aldehyde represents a surface treatment agent and may be selected from any linear, branched or alicyclic, substituted or non-substituted, saturated or unsaturated aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10.

In another preferred embodiment, the at least one aliphatic aldehyde is preferably chosen such that the number of carbon atoms is between 6 and 12, more preferably between 6 and 9, and most preferably 8 or 9.

The aliphatic aldehyde may be selected from the group of aliphatic aldehydes consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-6-nonenal, (Z)-6-nonenal, (E)-7-nonenal, (Z)-7-nonenal, 8-nonenal, decanal, (E)-2-decenal, (Z)-2-decenal, (E)-3-decenal, (Z)-3-decenal, (E)-4-decenal, (Z)-4-decenal, (E)-5-decenal, (Z)-5-decenal, (E)-6-decenal, (Z)-6-decenal, (E)-7-decenal, (Z)-7-decenal, (E)-8-decenal, (Z)-8-decenal, 9-decenal, undecanal, (E)-2-undecenal, (Z)-2-undecenal, (E)-3-undecenal, (Z)-3-undecenal, (E)-4-undecenal, (Z)-4-undecenal, (E)-5-undecenal, (Z)-5-undecenal, (E)-6-undecenal, (Z)-6-undecenal, (E)-7-undecenal, (Z)-7-undecenal, (E)-8-undecenal, (Z)-8-undecenal, (E)-9-undecenal, (Z)-9-undecenal, 10-undecenal, dodecanal, (E)-2-dodecenal, (Z)-2-dodecenal, (E)-3-dodecenal, (Z)-3-dodecenal, (E)-4-dodecenal, (Z)-4-dodecenal, (E)-5-dodecenal, (Z)-5-dodecenal, (E)-6-dodecenal, (Z)-6-dodecenal, (E)-7-dodecenal, (Z)-7-dodecenal, (E)-8-dodecenal, (Z)-8-dodecenal, (E)-9-dodecenal, (Z)-9-dodecenal, (E)-10-dodecenal, (Z)-10-dodecenal, 11-dodecenal, tridecanal, (E)-2-tridecenal, (Z)-2-tridecenal, (E)-3-tridecenal, (Z)-3-tridecenal, (E)-4-tridecenal, (Z)-4-tridecenal, (E)-5-tridecenal, (Z)-5-tridecenal, (E)-6-tridecenal, (Z)-6-tridecenal, (E)-7-tridecenal, (Z)-7-tridecenal, (E)-8-tridecenal, (Z)-8-tridecenal, (E)-9-tridecenal, (Z)-9-tridecenal, (E)-10-tridecenal, (Z)-10-tridecenal, (E)-11-tridecenal, (Z)-11-tridecenal, 12-tridecenal, butadecanal, (E)-2-butadecenal, (Z)-2-butadecenal, (E)-3-butadecenal, (Z)-3-butadecenal, (E)-4-butadecenal, (Z)-4-butadecenal, (E)-5-butadecenal, (Z)-5-butadecenal, (E)-6-butadecenal, (Z)-6-butadecenal, (E)-7-butadecenal, (Z)-7-butadecenal, (E)-8-butadecenal, (Z)-8-butadecenal, (E)-9-butadecenal, (Z)-9-butadecenal, (E)-10-butadecenal, (Z)-10-butadecenal, (E)-11-butadecenal, (Z)-11-butadecenal, (E)-12-butadecenal, (Z)-12-butadecenal, 13-butadecenal, and mixtures thereof. In a preferred embodiment, the aliphatic aldehyde is selected from the group consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-7-nonenal, (Z)-7-nonenal, 8-nonenal and mixtures thereof.

In another preferred embodiment, the at least one aliphatic aldehyde is a saturated aliphatic aldehyde. In this case the aliphatic aldehyde is selected from the group consisting of hexanal, heptanal, octanal, nonanal, decanal, undecanal, dodecanal, tridecanal, butadecanal and mixtures thereof. Preferably, the at least one aliphatic aldehyde in the form of a saturated aliphatic aldehyde is selected from the group consisting of hexanal, heptanal, octanal, nonanal, decanal, undecanal, dodecanal and mixtures thereof. For instance, the at least one aliphatic aldehyde in the form of a saturated aliphatic aldehyde is selected from octanal, nonanal and mixtures thereof.

If a mixture of two aliphatic aldehydes, e.g. two saturated aliphatic aldehydes such as octanal and nonanal is used according to the present invention, the weight ratio of octanal and nonanal is from 70:30 to 30:70 and more preferably from 60:40 to 40:60. In one especially preferred embodiment of the present invention, the weight ratio of octanal and nonanal is about 1:1.

The term "salty reaction products" of the at least one aliphatic aldehyde in the meaning of the present invention refers to products obtained by contacting the at least one ground calcium carbonate-comprising filler material with the at least one aliphatic aldehyde. Said reaction products are formed between at least a part of the applied at least one aliphatic aldehyde and reactive molecules located at the surface of the at least one filler material, preferably the at least one ground calcium carbonate-comprising filler material.

In one embodiment, the molar ratio of the at least one aliphatic aldehyde to the salty reaction product(s) thereof is from 99.9:0.1 to 0.1:99.9, preferably from 70:30 to 90:10.

The wording "molar ratio of the at least one aliphatic aldehyde to the salty reaction product(s) thereof" in the meaning of the present invention refers to the sum of the molecular weight of the aliphatic aldehyde to the sum of the molecular weight of the aliphatic aldehyde in the salty reaction products.

Methods for preparing the surface-treated filler material product treated with at least one aliphatic aldehyde and suitable compounds for coating are described e.g. in EP 2 390 285 A1, which is thus incorporated herewith by reference.

According to another embodiment of the present invention, the surface treated filler material comprises a treatment layer on at least a part of the surface of the at least one ground calcium carbonate-comprising filler material, wherein the treatment layer comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof.

The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride in the meaning of the present invention refers to a succinic anhydride wherein a hydrogen atom is substituted by another substituent.

The term "mono-substituted" succinic acid in the meaning of the present invention refers to a succinic acid wherein a hydrogen atom is substituted by another substituent.

The term "salty reaction products" of the at least one mono-substituted succinic anhydride refers to products obtained by contacting the at least one ground calcium carbonate-comprising filler material with one or more mono-substituted succinic anhydride(s). Said salty reaction products are formed between the mono-substituted succinic acid which is formed from the applied mono-substituted succinic anhydride and reactive molecules located at the surface of the at least one ground calcium carbonate-comprising filler material. Alternatively, said salty reaction products are formed between the mono-substituted succinic acid, which may optionally be present with the at least one mono-substituted succinic anhydride, and reactive molecules located at the surface of the at least one ground calcium carbonate-comprising filler material.

For example, the treatment layer on the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof. More preferably, the treatment layer on the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from at least C2 to C30, preferably from C3 to C20 and most preferably from C4 to C18 in the substituent and/or salty reaction products thereof.

Methods for preparing the surface-treated filler material product treated with at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and suitable compounds for coating are described e.g. in WO 2016/023937 A1, which is thus incorporated herewith by reference.

According to another embodiment of the present invention, the surface treated filler material product comprises a treatment layer on at least a part of the surface of the at least one ground calcium carbonate-comprising filler material, wherein the treatment layer comprises at least one polydialkylsiloxane.

Preferred polydialkylsiloxanes are described e.g. in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

The at least one polydialkylsiloxane is preferably present in a quantity such that the total amount of said polydialkylsiloxane on at least a part of the surface of the at least one ground calcium carbonate-comprising filler material, is less than 1 000 ppm, more preferably less than 800 ppm and most preferably less than 600 ppm. For example, the total amount of the polydialkylsiloxane on at least a part of the surface of the at least one ground calcium carbonate-comprising filler material, is from 100 to 1 000 ppm, more preferably from 200 to 800 ppm and most preferably from 300 to 600 ppm, e.g. from 400 to 600 ppm.

The treatment layer on the surface of the at least one ground calcium carbonate-comprising filler material preferably comprises at least one saturated aliphatic linear or branched carboxylic acid and salty reaction products thereof, and/or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof. More preferably, the treatment layer on the surface of the at least one ground calcium carbonate-comprising filler material comprises at least one saturated aliphatic linear or branched carboxylic acid and salty reaction products thereof.

In one embodiment, the treatment layer on at least a part of the surface of the at least one ground calcium carbonate-comprising filler material comprises a mixture of the above materials, preferably a mixture of two materials.

Thus, an after treatment layer may be present on the treatment layer.

An "after treatment layer" in the meaning of the present invention refers to a layer, preferably a monolayer of a surface treatment agent which can be different from the treatment layer, the "after treatment layer" is located on the "treatment layer".

In one preferred embodiment the surface treatment of the at least one ground calcium carbonate-comprising filler material is carried out in two steps, the first step comprising a treatment by a phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent for forming a treatment layer and the second step comprising a treatment by at least one polydialkylsiloxane for forming an after treatment layer.

In another embodiment the surface treatment is carried out by treating the at least one ground calcium carbonate-comprising filler material simultaneously with a phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and at least one polydialkylsiloxane for forming a treatment layer.

Furthermore, the surface treatment can be carried out by treating the at least one ground calcium carbonate-comprising filler material first with a polydialkylsiloxane and subsequently with phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent.

Preferably, the after treatment layer comprises at least one polydialkylsiloxane.

Thus, the treatment layer on at least a part of the surface of the at least one ground calcium carbonate-comprising filler material preferably comprises a phosphoric acid ester blend of one or more phosphoric acid mono-ester and salty reaction products thereof and/or one or more phosphoric acid di-ester and salty reaction products thereof and the after treatment layer comprises at least one polydialkylsiloxane.

Alternatively, the treatment layer on at least a part of the surface of the at least one ground calcium carbonate-comprising filler material comprises at least one saturated aliphatic linear or branched carboxylic acid and salty reaction products thereof and the after treatment layer comprises at least one polydialkylsiloxane.

Alternatively, the treatment layer on at least a part of the surface of the at least one ground calcium carbonate-comprising filler material comprises at least one aliphatic aldehyde and/or salty reaction products thereof and the after treatment layer comprises at least one polydialkylsiloxane.

Alternatively, the treatment layer on at least a part of the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof and the after treatment layer comprises at least one polydialkylsiloxane.

More preferably, the treatment layer on at least a part of the surface of the at least one ground calcium carbonate-comprising filler material comprises, most preferably consists of, at least one saturated aliphatic linear or branched carboxylic acid and salty reaction products thereof or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof and the after treatment layer comprises, more preferably consists of, at least one polydialkylsiloxane. For example, the treatment layer on at least a part of the surface of the at least one ground calcium carbonate-comprising filler material comprises, most preferably consists of, at least one saturated aliphatic linear or branched carboxylic acid and salty reaction products thereof and the after treatment layer comprises, more preferably consists of, at least one polydialkylsiloxane.

According to one embodiment the salty reaction product(s) of the phosphoric acid ester, the one or more phosphoric acid mono-ester, the one or more phosphoric acid di-ester or the at least one saturated aliphatic linear or branched carboxylic acid, the at least one aliphatic aldehyde, or at least one mono-substituted succinic anhydride are one or more calcium and/or magnesium salts thereof.

Thus, it is appreciated that the at least one ground calcium carbonate-comprising filler material product comprises, and preferably consists of, at least one ground calcium carbonate-comprising filler material and a treatment layer comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or v. at least one polydialkylsiloxane, and/or vi. mixtures of the materials according to i. to v.

The treatment layer is formed on the surface of said at least one ground calcium carbonate-comprising filler material.

It is one requirement of the present invention that the surface-treated filler material product comprises the treatment layer in an amount from 0.1 to 2.3 wt.-%, based on the total dry weight of the at least one ground calcium carbonate-comprising filler material.

According to one embodiment the surface-treated filler material product comprises the treatment layer in an amount of from 0.2 to 2.0 wt.-%, preferably from 0.4 to 1.9 wt.-% and most preferably from 0.5 to 1.8 wt.-%, based on the total dry weight of the at least one ground calcium carbonate-comprising filler material.

The treatment layer is preferably characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or at least one polydialkylsiloxane, and/or mixtures of said materials on the surface of the surface-treated filler material product is from 0.05 to 1 wt.-%/m$^2$, more preferably from 0.1 to 0.5 wt.-%/m$^2$ and most preferably from 0.15 to 0.25 wt.-%/m$^2$ of the at least one ground calcium carbonate-comprising filler material.

In one embodiment of the present invention, the treatment layer is characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or at least one polydialkylsiloxane, and/or mixtures of said materials on the surface of the surface-treated filler material product is from 0.1 to 5 mg/m², more preferably from 0.25 to 4.5 mg/m² and most preferably from 1.0 to 4.0 mg/m² of the at least one calcium carbonate-comprising material.

It is appreciated that the surface-treated filler material product preferably features a volatile onset temperature ≥250° C. For example, the surface-treated filler material product features a volatile onset temperature ≥260° C. or ≥270° C. In one embodiment, the surface-treated filler material product features a volatile onset temperature of 250° C. to 400° C., preferably from 260° C. to 400° C. and most preferably from 270° C. to 400° C.

Additionally or alternatively, the surface-treated filler material product features a total volatiles between 25 and 350° C. of less than 0.25% by mass, and preferably of less than 0.23% by mass, e.g. of from 0.04 to 0.21% by mass, preferably from 0.08 to 0.15% by mass, more preferably from 0.1 to 0.12% by mass.

Furthermore, the surface-treated filler material product features a low water pick up susceptibility. It is preferred that the moisture pick up susceptibility of the surface-treated filler material product is such that its total surface moisture level is less than 1 mg/g of dry calcium carbonate-comprising filler material, at a temperature of about +23° C. (±2° C.). For example, the surface-treated filler material product has a moisture pick up susceptibility of from 0.1 to 1 mg/g, more preferably of from 0.2 to 0.9 mg/g and most preferably of from 0.2 to 0.8 mg/g of dry calcium carbonate-comprising material after at a temperature of +23 C (±2° C.).

Additionally or alternatively, the surface-treated filler material product has a hydrophilicity of below 8:2 volumetric ratio of water:ethanol measured at +23° C. (±2° C.) with the sedimentation method. For example, the surface-treated filler material product has a hydrophilicity of below 7:3 volumetric ratio of water:ethanol measured at +23° C. (±2° C.) with the sedimentation method.

In order to achieve a favorable formation of voids, the at least one layer of the mono or multi-layer biaxially oriented polyester film comprises the surface-treated filler material product in an amount from 0.1 to 30 wt.-%, based on the total weight of the layer.

According to one embodiment the at least one layer of the mono or multi-layer biaxially oriented polyester film comprises the surface-treated filler material product in an amount from 1 to 28 wt.-%, based on the total weight of the layer, preferably from 2 to 26 wt.-%, more preferably from 3 to 25 wt.-%, even more preferably from 4.5 to 23 wt.-%, and most preferably from 4 to 20 wt.-%.

According to one aspect of the present invention, the surface-treated filler material product described above is used as voiding agent in a mono or multi-layer biaxially oriented polyester film.

Mono or Multi-Layer Biaxially Oriented Polyester Film

According to the present invention a mono or multi-layer biaxially oriented polyester film is provided, wherein at least one layer of the film comprises at least one polyester in an amount ranging from 70 to 99.9 wt.-% and a surface-treated filler material product in an amount ranging from 0.1 to 30 wt.-%, based on the total weight of the layer, wherein the surface-treated filler material product comprises A) at least one ground calcium carbonate-comprising filler material having a weight median particle size $d_{50}$ in the range from 0.5 μm to 2.5 μm, and
B) a treatment layer on the surface of the at least one ground calcium carbonate-comprising filler material comprising
   i. a phosphoric acid ester blend of one or more phosphoric acid mono-ester and salty reaction products thereof and/or one or more phosphoric acid di-ester and salty reaction products thereof, and/or
   ii. at least one saturated aliphatic linear or branched carboxylic acid and salty reaction products thereof, and/or
   iii. at least one aliphatic aldehyde and/or salty reaction products thereof, and/or
   iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or
   v. at least one polydialkylsiloxane, and/or
   vi. mixtures of the materials according to i. to v.,
wherein the surface-treated filler material product comprises the treatment layer in an amount of from 0.1 to 2.3 wt.-%, based on the total dry weight of the at least one ground calcium carbonate-comprising filler material It is appreciated that the mono or multi-layer biaxially oriented polyester film especially features a low density. Thus, the mono or multi-layer biaxially oriented polyester film, especially the at least one polyester and surface-treated filler material product comprising layer, preferably has a density from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m².

According to one embodiment, the median thickness of the mono or multi-layer biaxially oriented polyester film, especially the at least one polyester and surface-treated filler material product comprising layer, is from 0.5 to 500 μm, preferably from 4 to 400 μm, more preferably from 5 to 300 μm and most preferably from 6 to 250 μm, e.g. from 8 to 150 μm.

According to one embodiment, the mono or multi-layer biaxially oriented polyester film, especially the at least one polyester and surface-treated filler material product comprising layer, has a median thickness from 0.5 to 500 μm, preferably from 4 to 400 μm, more preferably from 5 to 300 μm and most preferably from 6 to 250 μm, e.g. from 8 to 150 μm and a density from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m².

It is appreciated that the biaxially oriented polyester film is a mono or multi-layer film.

In case of a multi-layer biaxially oriented polyester film, the film consists of two or more layers such as two to ten layers, preferably three layers, which are adjacent to each other. If the multi-layer film is a three layer film, the film preferably has the film structure A-B-A or A-B-C. In the multi-layer film, the core layer is preferably voided, i.e. the layer comprising the at least one polyester and the surface-treated filler material product. In one embodiment, the multi-layer film comprises a barrier layer which is located between two adjacent layers. The "barrier layer" in the meaning of the present application refers to a diffusion barrier, e.g. an oxygen and/or water vapor barrier, which is used for protecting the packed goods from various external influences.

The barrier layer can be of any material known in the art as being suitable for this purpose. For example, the barrier layer can be an aluminum layer, $Al_2O_3$ layer, $SiO_x$ layer, ethylene vinyl alcohol layer, poly(vinyl alcohol) layer, polyvinylidene chloride layer, polypropylene layer, preferably an oriented polypropylene layer, a polyethylene layer, preferably an oriented polyethylene layer, a polyester barrier layer, e.g. those sold under the HOSTAPHAN® brand, and mixtures thereof.

It is appreciated that the median thickness of the mono or multi-layer biaxially oriented polyester film, especially of the layer comprising the surface-treated filler material product, may vary in a broad range depending on the product to be produced.

For example, the at least one polyester and surface-treated filler material product comprising layer, is preferably of higher thickness than the other individual layers, i.e. the layers not containing the at least one polyester and/or the surface-treated filler material product. Alternatively, the at least one polyester and surface-treated filler material product comprising layer is of about the same thickness than the other layers together, i.e. the layers not containing the at least one polyester and/or the surface-treated filler material product, preferably the at least one polyester and the surface-treated filler material product.

Preferably, the mono or multi-layer biaxially oriented polyester film, especially the at least one polyester and surface-treated filler material product comprising layer, has a median thickness from 0.5 to 500 μm, preferably from 4 to 400 μm, more preferably from 5 to 300 μm and most preferably from 6 to 250 μm, e.g. from 8 to 150 μm.

The mono or multi-layer biaxially oriented polyester film, especially the at least one polyester and surface-treated filler material product comprising layer, is advantageous as it is a well-balanced microporous film/layer. That is to say, a microporous film or layer is provided, i.e. by controlling the formation of voids, having low density and opaque appearance.

Thus, the mono or multi-layer biaxially oriented polyester film, especially the at least one polyester and surface-treated filler material product comprising layer, preferably has
  a) a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, and/or
  b) an opacity of ≥50%, preferably of ≥55% and most preferably of ≥60%.

For example, the mono or multi-layer biaxially oriented polyester film, especially the at least one polyester and surface-treated filler material product comprising layer, preferably has
  a) a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, or
  b) an opacity of ≥50%, preferably of ≥55% and most preferably of ≥60%.

If not otherwise indicated, the mechanical and optical properties described herein refer to a polyester and surface-treated filler material product comprising layer or film prepared in accordance with the example section set out herein below, i.e. by using a biaxial lab stretcher (Model Maxi Grip 750S Bi-axial Laboratory Stretching Frame, from Dr. Collin GmbH, Germany) under the described conditions. It is thus appreciated that the results for a polyester and surface-treated filler material product comprising layer or film prepared under differing conditions may deviate from the mechanical and optical properties defined herein.

Furthermore, the mono or multi-layer biaxially oriented polyester film, especially the at least one polyester and surface-treated filler material product comprising layer, is advantageous as the mechanical properties of the film, especially the layer, are kept on a high level.

For example, at a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, the mono or multi-layer biaxially oriented polyester film, especially the at least one polyester and surface-treated filler material product comprising layer, has a tensile strength in machine direction, measured according to ISO 527-3, in the range from 80 to 200 MPa, more preferably in the range from 90 to 190 MPa and most preferably in the range from 100 to 180 MPa.

Additionally or alternatively, at a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, the mono or multi-layer biaxially oriented polyester film, especially the at least one polyester and surface-treated filler material product comprising layer, has a tensile strength in transverse direction, measured according to ISO 527-3, in the range from 80 to 200 MPa, more preferably in the range from 90 to 180 MPa and most preferably in the range from 100 to 160 MPa.

In one embodiment, at a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, the mono or multi-layer biaxially oriented polyester film, especially the at least one polyester and surface-treated filler material product comprising layer, has a modulus of elasticity in machine direction, measured according to ISO 527-3, in the range from 2 000 to 5 000 MPa, more preferably in the range from 2 200 to 4 500 MPa and most preferably in the range from 2 400 to 4 000 MPa.

Additionally or alternatively, at a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, the mono or multi-layer biaxially oriented polyester film, especially the at least one polyester and surface-treated filler material product comprising layer, has a modulus of elasticity in transverse direction, measured according to ISO 527-3, in the range from 2 000 to 5 000 MPa, more preferably in the range from 2 200 to 4 500 MPa and most preferably in the range from 2 400 to 4 000 MPa.

In one embodiment, at a density in the range from 0.8 to 1.4 $g/cm^3$, preferably from 0.8 to 1.38 $g/cm^3$, more preferably from 0.85 to 1.35 $g/cm^3$, even more preferably from 0.85 to 1.32 $g/cm^3$ and most preferably from 0.85 to 1.28 $g/m^2$, the mono or multi-layer biaxially oriented polyester film, especially the at least one polyester and surface-treated filler material product comprising layer, has a maximum elongation at break in machine direction, measured according to ISO 527-3, in the range from 40 to 90%, more preferably in the range from 45 to 80% and most preferably in the range from 50 to 70%.

Additionally or alternatively, at a density in the range from 0.8 to 1.4 $g/cm^3$, preferably from 0.8 to 1.38 $g/cm^3$, more preferably from 0.85 to 1.35 g/cm³, even more preferably from 0.85 to 1.32 g/cm³ and most preferably from 0.85 to 1.28 g/m², the mono or multi-layer biaxially oriented polyester film, especially the at least one polyester and surface-treated filler material product comprising layer, has a maximum elongation at break in transverse direction, measured according to ISO 527-3, in the range from 40 to 90%, more preferably in the range from 45 to 80% and most preferably in the range from 50 to 75%.

Furthermore, it is appreciated that the mono or multi-layer biaxially oriented polyester film, preferably the at least one layer comprising the surface-treated filler material product, is microporous and has good optical properties.

The microporosity of the mono or multi-layer biaxially oriented polyester film, especially the at least one polyester and surface-treated filler material product comprising layer, can be measured by its water vapor transmission rate. According to one embodiment the mono or multi-layer biaxially oriented polyester film, especially the at least one polyester and surface-treated filler material product comprising layer, has a water vapor transmission rate (WVTR) below 100 g/(m²·day), preferably from 20 to 100 g/(m²·day), measured with a Lyssy L80-5000 measuring device according to ASTM E398.

According to one embodiment, the mono or multi-layer biaxially oriented polyester film, especially the at least one polyester and surface-treated filler material product comprising layer, preferably at a density in the range from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m², has a brightness Ry, according to DIN 53163, from 50 to 100%, preferably from 60 to 98% and most preferably from 70 to 96%.

Additionally or alternatively, the mono or multi-layer biaxially oriented polyester film, especially the at least one polyester and surface-treated filler material product comprising layer, preferably at a density in the range from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m², has L*, according to DIN 6174, from 60 to 100, preferably from 70 to 100 and most preferably from 80 to 98.

Additionally or alternatively, the mono or multi-layer biaxially oriented polyester film, preferably the at least one layer comprising the surface-treated filler material product, preferably at a density in the range from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m², has an opacity, according to DIN 53146, of ≥50%, preferably of ≥55% and most preferably of ≥60%.

Additionally or alternatively, the mono or multi-layer biaxially oriented polyester film, especially the at least one polyester and surface-treated filler material product comprising layer, preferably at a density in the range from 0.8 to 1.4 g/cm³, preferably from 0.8 to 1.38 g/cm³, more preferably from 0.85 to 1.35 g/cm³, even more preferably from 0.85 to 1.32 g/cm³ and most preferably from 0.85 to 1.28 g/m², has a transmission, according to ASTM D1003, from 2 to 60%, preferably from 3 to 40% and most preferably from 4 to 25%.

According to one embodiment the at least one polyester and surface-treated filler material product comprising layer of the mono or multi-layer biaxially oriented polyester film further comprises a thermoplastic polymer, preferably cross-linked with a crosslinking agent, selected from the group consisting of a polyolefin, a cyclic olefin copolymer (COC), a polyketone, a polysulphone, a fluoropolymer, a polyacetal, an ionomer, an acrylic resin, a polystyrene resin, a polyurethane, a polyamide, a polycarbonate, a polyacrylonitrile and a copolymerized resin and mixtures thereof.

Thus, if the mono or multi-layer biaxially oriented polyester film comprises a thermoplastic polymer, the thermoplastic polymer is present in the same layer as the at least one polyester and the surface-treated filler material product.

It is appreciated that the presence of the thermoplastic polymer in the at least one polyester and surface-treated filler material product comprising layer of the mono or multi-layer biaxially oriented polyester film is advantageous as it acts as organic voiding agent and thus improves the formation of voids during the preparation of the film or layer. However, the thermoplastic polymer does typically not help to increase the opaque appearance of the film or layer.

It is to be noted that the thermoplastic polymer is not soluble in the at least one polyester. Thus, the at least one polyester forms a continuous phase, i.e. a matrix, and dispersed therein is the thermoplastic polymer, i.e. forms a dispersed phase.

Polyolefins that may be used are preferably selected from the group consisting of polypropylene, polyethylene, polybutylene, and mixtures thereof.

The polyolefin may be a copolymer or a homopolymer, the latter being especially preferred.

In case the polyolefin is a copolymer, the polyolefin is preferably selected from the group comprising ethylene vinyl acetate, ethylene vinyl alcohol copolymer, ethylene methyl acrylate copolymer, ethylene butyl acrylate copolymer, ethylene acrylic acid copolymer, and mixtures thereof.

In one embodiment, the thermoplastic polymer is a polypropylene, preferably a propylene homopolymer.

The thermoplastic polymer being a polyolefin preferably has a melt flow rate $MFR_2$ (230° C.; 2.16 kg) measured according to ISO 1133 in the range from 1 to 20 g/10 min, preferably from 1 to 15 g/10 min, more preferably from 1 to 10 g/10 min and most preferably from 1 to 5 g/10 min.

Additionally or alternatively, the thermoplastic polymer being a polyolefin has preferably a density of <920 g/cm³, more preferably <910 g/cm³, even more preferably in the range from 800 to 920 g/cm³, yet more preferably from 850 to 910 g/cm³ and most preferably from 880 to 910 g/cm³.

If polyolefins such as polypropylene are used as a voiding agent, it is to be noted that the polyolefins often do not disperse well and may require a compatibilizer such as, for example, a carboxylated polyethylene to obtain a uniform distribution of voids. When used with the at least one polyester to produce voided films, polyolefins also tend to lower the polyester film surface tension and thereby reduce the printability of the film. Polyolefins are softer than the at least one polyester at room temperature which sometimes lowers the overall film modulus to unacceptable levels. Finally, polyolefins are relatively inefficient voiding agents and large amounts are required to achieve the necessary density reduction, which leads to poor surface roughness and printing problems, thus making it difficult to use polyolefins in single layer films.

The cyclic olefin copolymer (COC) in the meaning of the present invention refers to a copolymer of ethylene and at least one cyclic olefin selected from the group consisting of bicycloalkene and tricycloalkene.

Typical examples of the cyclic olefin copolymer (COC) include bicyclo[2.2.1]hept-2-ene, 6-methylbicyclo[2.2.1]hept-2-ene, 5,6-dimethylbicyclo[2.2.1]hept-2-ene, 1-methylbicyclo[2.2.1]hept-2-ene, 6-ethylbicyclo[2.2.,1]hept-2-ene, 6-n-butylbicyclo[2.2.1]hept-2-ene, 6-i-butylbicyclo[2.2.1]hept-2-ene, 7-methylbicyclo[2.2.1]hept-2-ene, tricyclo[4.3.0.1$^{2,5}$]-3-decene, 2-methyl-tricyclo[4.3.0.1$^{2,5}$]-3-decene, 5-methyl-tricyclo[4.3.0.1$^{2,5}$]-3-decene, tricyclo [4.4.0.1$^{2,5}$]-3-decene and 10-methyl-tricyclo[4.4.0.1$^{2,5}$]-3-decene.

A polyamide that may be used is preferably a polyamide 6 (also named nylon 6) or polyamide 66 (also named nylon 66).

For example, the thermoplastic polymer is a polypropylene, preferably a propylene homopolymer, The at least one polyester and surface-treated filler material product comprising layer of the mono or multi-layer biaxially oriented polyester film comprises the thermoplastic polymer in an amount ranging from 0.1 to 29.9 wt.-%, preferably from 1 to 28 wt.-%, more preferably from 2 to 26 wt.-%, even more preferably from 3 to 25 wt.-%, still more preferably from 4.5 to 23 wt.-%, and most preferably from 4 wt.-% to 20 wt.-%, based on the total weight of the layer.

In one embodiment, the at least one polyester and surface-treated filler material product comprising layer of the mono or multi-layer biaxially oriented polyester film comprises the thermoplastic polymer in an amount being below the amount of the surface-treated filler material product. For example, the at least one polyester and surface-treated filler material product comprising layer of the mono or multi-layer biaxially oriented polyester film comprises the thermoplastic polymer in an amount being at least 20 wt.-%, more preferably at least 30 wt.-% and most preferably at least 50 wt.-%, based on the total weight of the surface-treated filler material product, below the amount of the surface-treated filler material product.

Additionally or alternatively, the at least one polyester and surface-treated filler material product comprising layer of the film further comprises an inorganic filler material different from the surface-treated filler material product. Preferably, the inorganic filler material different from the surface-treated filler material product is selected from the group consisting of alumina, silica, titanium dioxide, alkaline metal salts, such as barium carbonate, calcium sulfate, barium sulfate and mixtures thereof. Barium sulfate is particularly preferred as inorganic filler material.

It is appreciated that the presence of the inorganic filler material different from the surface-treated filler material product in the at least one polyester and surface-treated filler material product comprising layer of the mono or multi-layer biaxially oriented polyester film is advantageous as it acts as inorganic voiding agent and thus further improves the formation of voids during the preparation of the film. Furthermore, the inorganic filler material different from the surface-treated filler material product further increases the opaque appearance of the film or layer.

However, if the at least one polyester and surface-treated filler material product comprising layer of the film further comprises an inorganic filler material different from the surface-treated filler material product, the amount of the inorganic filler material is typically below the amount of the surface-treated filler material product.

For example, the at least one polyester and surface-treated filler material product comprising layer of the film comprises the inorganic filler material different from the surface-treated filler material product in an amount of 1 to 10 wt.-%, based on the total weight of the layer.

In one embodiment, the at least one polyester and surface-treated filler material product comprising layer of the mono or multi-layer biaxially oriented polyester film comprises the inorganic filler material different from the surface-treated filler material product in an amount being at least 20 wt.-%, more preferably at least 30 wt.-% and most preferably at least 50 wt.-%, based on the total weight of the surface-treated filler material product, below the amount of the surface-treated filler material product.

The weight median particle size $d_{50}$ of the inorganic filler material different from the surface-treated filler material product is preferably similar to the weight median particle size $d_{50}$ of the surface-treated filler material product. Thus, the inorganic filler material different from the surface-treated filler material product preferably has a weight median particle size $d_{50}$ in the range from 0.5 μm to 2.5 μm, preferably from 0.5 μm to 2 μm, more preferably from 0.5 μm to 1.8 μm, and most preferably from 0.6 μm to 1.8 μm.

Additionally or alternatively, the mono or multi-layer biaxially oriented polyester film may additionally comprise additives which are typically used as additives in the films to be produced. Advantageously, they are already added to the polymer or the polymer mixture prior to melting. Alternatively, said compounds can be added to the masterbatch.

For example, the mono or multi-layer biaxially oriented polyester film comprises an additive selected from the group consisting of light stabilizers, optical brightener, blue dyes, antiblocking agents, white pigments, and mixtures thereof.

Preferably, the at least one polyester and surface-treated filler material product comprising layer comprises an additive selected from the group consisting of light stabilizers, optical brightener, blue dyes, antiblocking agents, white pigments, and mixtures thereof.

It is appreciated that light stabilizers which are UV stabilizers or UV absorbers are chemical additives which can intervene in the physical and chemical processes of light-induced degradation. Carbon black and other pigments can provide some degree of protection from the adverse effects of light, but these substances are unsuitable for white films since they cause discoloration or color change. The only additives suitable for white films are organic or organometallic compounds which give no, or only an extremely low level of, color or color change to the film to be stabilized. Light stabilizers which are suitable UV stabilizers absorb at least 70%, preferably 80%, particularly preferably 90%, of the UV light in the wavelength range from 180 to 380 nm, preferably from 280 to 350 nm. Those which are particularly suitable are those, which in the temperature range from 260 to 300° C., are thermally stable, i.e. do not decompose and do not cause release of gases. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preferably 2-hydroxybenzotriazoles and triazines. Most preferably, the light stabilizer is hydroxy phenyl triazin (Tinuvin®1577, BASF, Ludwigshafen, Germany). The amounts of the light stabilizers used are typically from 10 to 50 000 ppm, preferably from 20 to 30 000 ppm, and most preferably from 50 to 25 000 ppm, based on the total weight of the film, preferably the at least one polyester and surface-treated filler material product comprising layer.

A further additive present in the film, preferably the at least one polyester and surface-treated filler material product comprising layer, if desired is an optical brightener. The optical brighteners according to the invention are capable of absorbing UV radiation in the wavelength range from about 360 to 380 nm and of emitting this again as visible, longer-wavelength, blue-violet light. Suitable optical brighteners are bisbenzoxazoles, phenylcoumarins and bissteryl-biphenyls, in particular phenyl coumarin, and particularly preferably triazine-phenylcoumarin (Tinopal®, BASF, Ludwigshafen, Germany). The amounts of the optical brighteners used are typically from 10 to 50 000 ppm, preferably from 20 to 30 000 ppm, and most preferably from 50 to 25 000 ppm, based on the total weight of the film, preferably the at least one polyester and surface-treated filler material product comprising layer.

Suitable white pigments are preferably titanium dioxide, barium sulfate, calcium carbonate, kaolin and silica, and preference is given to titanium dioxide and barium sulfate. The titanium dioxide particles may be composed of anatase or of brookite or of rutile, preferably predominantly of rutile, which has higher hiding power than anatase. In a preferred embodiment, 95 wt.-% of the titanium dioxide particles are rutile. The weight median particle size $d_{50}$ of the white pigment is typically below the weight median particle size $d_{50}$ of the surface-treated filler material product and thus the white pigment does not act as a voiding agent. Preferable, the weight median particle size $d_{50}$ of the white pigment is in the range from 0.10 to 0.30 µm. The amount of the white pigment in the film, preferably the at least one polyester and surface-treated filler material product comprising layer, is usefully from 0.3 to 25 wt.-%, based on the total weight of the film, preferably the at least one polyester and surface-treated filler material product comprising layer.

Additionally or alternatively, blue dyes, preferably blue dyes soluble in polyester, may also be added to the film, preferably the at least one polyester and surface-treated filler material product comprising layer, if this is useful. For example, blue dyes which have proven successful are selected from cobalt blue, ultramarine blue and anthraquinone dyes, in particular Sudan blue 2 (BASF, Ludwigshafen, Germany). The amounts of the blue dyes used are typically from 10 to 10 000 ppm, preferably from 20 to 5 000 ppm, and most preferably from 50 to 1 000 ppm, based on the total weight of the film, preferably the at least one polyester and surface-treated filler material product comprising layer.

Additionally or alternatively, antiblocking agents may also be added to the film, preferably the at least one polyester and surface-treated filler material product comprising layer, if this is useful. Typical antiblocking agents are inorganic and/or organic particles, for example calcium carbonate different from the surface-treated filler material product, amorphous silica, talcum, magnesium carbonate, barium carbonate, calcium sulfate, barium sulfate, lithium phosphate, calcium phosphate, magnesium phosphate, aluminum oxide, carbon black, titanium dioxide, kaolin, or crosslinked polymer particles, for example polystyrene, acrylate, PMMA particles, or crosslinked silicones. Muscovite mica having an average particle size (weighted average) of 4.0 to 12 µm, preferably 6 to 10 µm, is also particularly suitable. As is generally known, mica is composed of platelet-like silicates, the aspect ratio of which is preferably in the range from 5 to 50. Mixtures of two and more different antiblocking agents or mixtures of antiblocking agents having the same composition but a different particle size can also be chosen as additives. The particles can be added directly or by means of masterbatches to the polymers of the individual layers of the film in the respective advantageous concentrations during extrusion. Antiblocking agents are preferably added to the outer layer(s), i.e. the layer being free of the surface-treated filler material product. The amounts of the antiblocking agent is generally from 0.01 to 1 wt.-%, based on the total weight of the film, preferably the at least one polyester and surface-treated filler material product comprising layer.

It is appreciated that the compounds which are used as additives can be present in the the at least one polyester and surface-treated filler material product comprising layer. In case of a multi-layer film, the compounds which are used as additives can be present in the at least one polyester and surface-treated filler material product comprising layer and/or in at least one of the additional layer(s).

The mono or multi-layer biaxially oriented polyester film of the present invention may be produced by any method known in the art. According to one embodiment, a process of producing a mono or multi-layer biaxially oriented polyester film comprises the steps of:

a) providing a composition comprising at least one polyester and a surface-treated filler material product, and
b) forming a film from the composition of step a), and
c) stretching the film obtained in step b) in machine direction (MD) and transverse direction (TD), wherein the stretching in machine direction (MD) and transverse direction (TD) is carried out sequential or simultaneously, wherein the surface-treated filler material product comprises
A) at least one ground calcium carbonate-comprising filler material having a weight median particle size $d_{50}$ in the range from 0.5 µm to 2.5 µm, and
B) a treatment layer on the surface of the at least one ground calcium carbonate-comprising filler material comprising
  i. a phosphoric acid ester blend of one or more phosphoric acid mono-ester and salty reaction products thereof and/or one or more phosphoric acid di-ester and salty reaction products thereof, and/or
  ii. at least one saturated aliphatic linear or branched carboxylic acid and salty reaction products thereof, and/or
  iii. at least one aliphatic aldehyde and/or salty reaction products thereof, and/or
  iv. at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, and/or
  v. at least one polydialkylsiloxane, and/or
  vi. mixtures of the materials according to i. to v.,
wherein the surface-treated filler material product comprises the treatment layer in an amount of from 0.1 to 2.3 wt.-%, based on the total dry weight of the at least one ground calcium carbonate-comprising filler material.

The composition of the at least one polyester and the surface-treated filler material product provided in process step a) can be a compound obtained by mixing and/or kneading the at least one polyester and the surface-treated filler material product to form a mixture. The at least one polyester and the surface-treated filler material product, and, if present, other optional additives, may be mixed and/or kneaded by the use of a suitable mixer, e.g. a Henschel mixer, a super mixer, a tumbler type mixer or the like. The compounding step may be done with a suitable extruder, preferably by a twin screw extruder (co or counter-rotating) or by any other suitable continuous compounding equipment, e.g. a continuous co-kneader (Buss), a continuous mixer (Farrel Pomini), a ring extruder (Extricom) or the like.

The continuous polymer mass from extrusion may be either pelletized by (hot cut) die face pelletizing with underwater pelletizing, eccentric pelletizing and water ring pelletizing or by (cold cut) strand pelletizing with underwater and conventional strand pelletizing to form the extruded polymer mass into pellets. Thus, the compound may be in form of pellets, beads, or granules.

Preferably, the composition of the at least one polyester and the surface-treated filler material product provided in process step a) is a compound obtained by mixing and/or kneading the at least one polyester and the surface-treated filler material product to form a mixture and continuously pelletizing the obtained mixture. For example, the continuously pelletizing is carried out under water.

Optionally, the compounding step may also be performed with a discontinuous or batch process using an internal (batch) mixer, e.g. a Banburry mixer (HF Mixing Group) or a Brabender mixer (Brabender) or the like.

According to one embodiment the compound comprises the surface-treated filler material product in an amount of from ≤30 wt.-%, preferably from 0.5 to 30 wt.-% and more preferably from 5 to 30 wt.-%, based on the total weight of the compound. It is appreciated that the composition provided in process step a) is preferably prepared by using polyester flakes, such as PET flakes. In this regard, it is preferred that the polyester flakes, e.g. the PET flakes, are pre-dried before preparing the composition of step a) to remove the moisture. For example, the polyester flakes, such as PET flakes, are pre-dried at 90° C. for 6 hours.

According to an optional embodiment, the composition provided in process step a) further comprises one or more of the additives/compounds described above.

According to one embodiment the composition provided in process step a) is a masterbatch. According to a preferred embodiment the masterbatch comprises the surface-treated filler material product in an amount of from >30 to 85 wt.-%, preferably from 35 to 80 wt.-% and more preferably from 40 to 70 wt.-%, based on the total weight of the masterbatch. The masterbatch may be in form of pellets, beads, or granules.

It is appreciated that the masterbatch can be prepared by the same method as described for the compound above. Thus, the masterbatch is preferably obtained by mixing and/or kneading the at least one polyester and the surface-treated filler material product to form a mixture. Preferably, the composition of the at least one polyester and the surface-treated filler material product provided in process step a) is a masterbatch obtained by mixing and/or kneading the at least one polyester and the surface-treated filler material product to form a mixture and continuously pelletizing the obtained mixture.

It is to be noted that the compound differs from the masterbatch in that the compound is not diluted during further processing. That is to say, the masterbatch is diluted during further processing.

A filter pressure test was carried out in order to determine the dispersion quality. The filter pressure test was performed on a commercially available Collin Pressure Filter Test Teach-Line FT-E20T-MP-IS. The test method was performed in agreement with European Standard EN 13900-5 with each of the corresponding polymer compositions (11.2 g effective calcium carbonate per 200 g of final sample, diluent: PET) using a filter screen as described in the mentioned European Standard EN 13900-5 chapter 6.64 (approx. 15 μm mesh size), wherein the melt pump was used at 10 rpm, the extruder speed was regulated in order to keep a constant pressure of 20 bar before the melt pump, and wherein the melt temperature was set to 290° C. The quality of the mineral dispersion in the polymer matrix is judged with the classification: good, medium or low which corresponds to the obtained filter pressure values classified as low, medium or high.

According to one embodiment the masterbatch has a filter pressure value in the range from 0.01 to 0.5 bar/g, preferably from 0.01 to 0.15 bar/g, and most preferably from 0.01 to 0.1 bar/g.

Alternatively, the compound has a filter pressure value in the range from 0.01 to 0.5 bar/g, preferably from 0.01 to 0.15 bar/g, and most preferably from 0.01 to 0.1 bar/g.

The inventors of the present invention found that the use of the surface-treated filler material product of the present invention in the masterbatch may result in a very finely and homogenously filled mono or multi-layer biaxially oriented polyester film. Another advantage of the surface-treated filler material product is that the resulting masterbatch provides a low filter pressure value. Without being bound to any theory it is believed that the specific properties of the surface-treated filler material product according to the present invention may render it especially suitable for application in mono or multi-layer biaxially oriented polyester films, which require to have the fillers as equally distributed through the film as possible, in order to obtain a uniform distribution barrier and vapor transmission properties throughout the film. Furthermore, the inventors found that the surface-treated filler material product of the present invention makes it possible to prepare biaxially oriented polyester films without film breakage and, moreover, that the resulting films have a low film density at high opacity.

The masterbatch is preferably mixed with the same or different polyester (as used as matrix in the masterbatch) and/or one or more additives described above before process step b) is carried out. According to a preferred embodiment, the masterbatch is mixed with the same polyester (as used as matrix in the masterbatch) before process step b) is carried out.

In one embodiment, the additives which are typically used as additives, e.g. light stabilizers, optical brightener, blue dyes, antiblocking agents, white pigments, and mixtures thereof, are added to the masterbatch.

Alternatively, process steps a) and b) are carried out simultaneously. Preferably, process steps a) and b) are carried out simultaneously in that the at least one polyester, more preferably pre-dried polyester flakes, e.g. pre-dried PET flakes, and the surface-treated filler material product, more preferably dry surface-treated filler material product, are added directly into an extruder to carry out process step b). That is to say, the composition of the at least one polyester and the surface-treated filler material product provided in process step a) is obtained by directly adding the surface-treated filler material product, preferably dry surface-treated filler material product, and the at least one polyester, more preferably pre-dried polyester flakes, e.g. pre-dried PET flakes, into the extruder to carry out process step b). Alternatively, the composition comprising at least one polyester and a surface-treated filler material product of step a) is obtained by adding the surface-treated filler material product to the polycondensation process of the at least one polyester. That is to say, the composition comprising at least one polyester and a surface-treated filler material product of step a) is obtained by adding the surface-treated filler material product either before or during or after to the polycondensation process of the at least one polyester. For example, the composition comprising at least one polyester and a surface-treated filler material product of step a) is obtained by adding the surface-treated filler material product either before or after, preferably after, to the polycondensation process of the at least one polyester. Thus, the composition comprising at least one polyester and a surface-treated filler material product of step a) can be provided as ready to use composition.

The process step b) may be carried out by any well-known techniques used for preparing polymer films. Examples of suitable film extrusion techniques are blown film extrusion or cast film extrusion. Preferably, process step b) is carried out by cast film extrusion.

Accordingly, process step b) is preferably an extrusion process.

In a preferred extrusion process for forming the film, the melted composition of the at least one polyester and the surface-treated filler material product provided in process step a) is extruded through a slot die and, in the form of a substantially amorphous prefilm, quenched on a chill roll.

In process step c) the film obtained in process step b) is stretched in machine direction (MD) and transverse direction (TD) in any order.

For example, the film obtained in process step b) is reheated and stretched in machine direction (MD) and transverse direction (TD), or in transverse direction (TD) and machine direction (MD), or in machine direction (MD), in transverse direction (TD) and again in machine direction (MD) and/or transverse direction (TD). Preferably, the film obtained in process step b) is reheated and stretched in machine direction (MD) and transverse direction (TD)

Thus, the stretching in step c) in machine direction (MD) and transverse direction (TD) can be carried out sequentially, simultaneously or with a LISIM process or a combination thereof. Preferably, the stretching in step c) in machine direction (MD) and transverse direction (TD) is carried out sequentially.

The stretching step c) may be carried out by any means known in the art. Such methods and devices for performing stretching step c) are known in the art, for example as LISIM or MESIM method (mechanical simultaneous stretching) known. LISIM procedures are described in detail in EP 1112167 and EP 0785858, which is herewith incorporated by reference. A MESIM method is described in US 2006/0115548, which is likewise herewith incorporated by reference. For example, the simultaneously biaxial stretching process can be performed by a batch type biaxial stretching machine such as the Model Maxi Grip 750S (from Dr. Collin GmbH, Germany) or the Brückner Karo IV (from Brückner Maschinenbau GmbH & Co. KG, Germany). This stretching process makes the film anisotropic due to molecular orientation.

The first stretching in machine direction (MD) may, if desired, be carried out simultaneously with the stretching in transverse direction (TD) (simultaneous stretching). There, then follows the heat-setting of the film at oven temperatures of from 200 to 260° C., in particular from 220 to 250° C. The film is then cooled and wound up.

During the stretching step the polyester may be delaminated from the surface of the surface-treated filler material product, whereby voids are formed in the mono or multi-layer biaxially oriented polyester film.

The stretching may be carried out by one step or by several steps. According to one embodiment process step c) is carried out from 1 to 10 times.

Stretch magnification determines film breakage at high stretching as well as breathability and the water vapor transmission of the obtained film, and so excessively high stretch magnification and excessively low stretch magnification are desirably avoided. According to one embodiment, in process step c), the film obtained in step b) is stretched to a stretch magnification from 1.2 to 6 times, more preferably 1.2 to 4 times into each direction.

Preferably, stretching step c) is carried out in that the film obtained in step b) is stretched
  a) in machine direction (MD) with a stretching ratio from 2 to 6, preferably from 3 to 4.5, and/or
  b) in transverse direction (TD) with a stretching ratio from 2 to 5, preferably from 3 to 4.5, and
  c) optionally for any second stretching in machine direction (MD) the stretching ratio from 1.1 to 3.

For example, stretching step c) is carried out in that the film obtained in step b) is stretched
  a) in machine direction (MD) with a stretching ratio from 2 to 6, preferably from 3 to 4.5, and
  b) in transverse direction (TD) with a stretching ratio from 2 to 5, preferably from 3 to 4.5, and
  c) optionally for any second stretching in machine direction (MD) the stretching ratio from 1.1 to 3.

According to one embodiment process step c) is carried out at a stretching temperature ranging from $T_g+10°$ C. to $T_g+60°$ C. ($T_g$=glass transition temperature).

In case the biaxially oriented polyester film is a multi-layer biaxially oriented polyester film, the film can be prepared by co-extrusion or by laminating the layers before or after stretching step c) (extrusion lamination). Preferably, the multi-layer biaxially oriented polyester film is prepared by laminating the layers after stretching step c). In one embodiment, a barrier layer is introduced between the layers of the multi-layer biaxially oriented polyester film. For example, the multi-layer biaxially oriented polyester film comprises an aluminum layer, $Al_2O_3$ layer, $SiO_x$ layer, ethylene vinyl alcohol layer, poly(vinyl alcohol) layer, polyvinylidene chloride layer, polypropylene layer, preferably an oriented polypropylene layer, a polyethylene layer, preferably an oriented polyethylene layer, a polyester barrier layer, e.g. those sold under the HOSTAPHAN® brand, and mixtures thereof, which is/are located between two adjacent layers. Thus, the biaxially oriented polyester film can be prepared by adding a barrier layer in the laminating step.

The inventors of the present invention found that the mono or multi-layer biaxially oriented polyester film according to the present invention, especially the at least one polyester and surface-treated filler material product comprising layer, is highly microporous at low density, especially the density is below the density typically achieved for biaxially oriented films or layers using barium sulfate or titanium dioxide as voiding agent. Furthermore, the biaxially oriented polyester film, especially the at least one polyester and surface-treated filler material product comprising layer, has an opaque appearance and can be prepared without film/layer breakage. Furthermore, the mono or multi-layer biaxially oriented polyester film, especially the at least one polyester and surface-treated filler material product comprising layer, provides good mechanical properties such as tensile strength, elongation at break or modulus of elasticity and optical properties such as gloss and transmittance.

The mono or multi-layer biaxially oriented polyester film according to the present invention can be used in many different applications. According to one embodiment, the mono or multi-layer biaxially oriented polyester film is used in packaging products, preferably flexible packaging products, food contact applications, paper and glass coverings, insulating materials, solar, preferably photovoltaic front- and backsheets, marine and aviation applications, science, electronic and acoustic applications, preferably displays, wires, cables, radio frequency identifications, flexible circuits, graphic arts, preferably labels, paper replacement and holograms, filter products, cosmetic products, household products, imaging and recording media, preferably photographic paper, X-ray film and thermal transfer imaging or industrial products, preferably capacitors, release sheets, fiberglass panels, laminating films, hot stamping foils and insulation facing.

According to a further aspect of the present invention, an article comprising mono or multi-layer biaxially oriented polyester film according to the present invention is provided, wherein the article is selected from the group consisting of packaging products, preferably flexible packaging products, food contact applications, paper and glass coverings, insulating materials, solar, preferably photovoltaic front and backsheets, marine and aviation applications, science, electronic and acoustic applications, preferably displays, wires, cables, radio frequency identifications, flexible circuits, graphic arts, preferably labels, paper replacement and holograms, filter products, cosmetic products, household products imaging and recording media, preferably photographic paper, X-ray film and thermal transfer imaging and industrial products, preferably capacitors, release sheets, fiberglass panels, laminating films, hot stamping foils and insulation facing.

The scope and interest of the invention will be better understood based on the following examples which are intended to illustrate certain embodiments of the present invention and are non-limitative.

EXAMPLES

1 Measurement Methods and Materials

In the following, measurement methods and materials implemented in the examples are described.

Intrinsic Viscosity

The intrinsic viscosity is measured according to DIN ISO 1628/1 and DIN ISO 1628/5, October 1999 (in decalin at 135° C.).

$MFR_2$

The $MFR_2$ is measured according to ISO 1133 (230° C., 2.16 kg load).

Crystallization Temperature $T_c$

The crystallization temperature is measured by differential scanning calorimetry (DSC) on a Mettler-Toledo "Polymer DSC instrument (Mettler-Toledo (Schweiz) GmbH, Switzerland). The crystallization curve was obtained during 10° C./min cooling and heating scans between 30° C. and 225° C. Crystallization temperatures were taken as the peak of endotherms and exotherms.

Particle Size

The particle distribution of the untreated ground calcium carbonate-comprising filler material was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Specific Surface Area (BET)

Throughout the present document, the specific surface area (in $m^2/g$) of the filler material is determined using the BET method (using nitrogen as adsorbing gas), which is well known to the skilled man (ISO 9277:2010).

Filter Pressure Value

The filter pressure test was performed on a commercially available Collin Pressure Filter Test Teach-Line FT-E20T-MP-IS (Dr. Collin GmbH, Germany). The test method was performed in agreement with European Standard EN 13900-5 with each of the corresponding polymer compositions (11.2 g effective calcium carbonate per 200 g of final sample, diluent: PET) using a filter screen as described in the mentioned European Standard EN 13900-5 chapter 6.64 (approx. 15 μm mesh size), wherein melt pump was used at 10 rpm, the extruder speed was regulated in order to keep a constant pressure of 20 bar before the melt pump, and wherein the melt temperature was set to 290° C. The quality of the mineral dispersion in the polymer matrix is judged with the classification: good, medium or and low which corresponds the obtained filter pressure values classified as low, medium and high.

Ash Content

The ash content in [wt.-%] of the masterbatches and films was determined by incineration of a sample in an incineration crucible which is put into an incineration furnace at 570° C. for 2 hours. The ash content was measured as the total amount of remaining inorganic residues.

Film Thickness

The film thickness was determined using a digital measuring slide Mitutoyo IP 66 (Mitutoyo Europe GmbH, Neuss, Germany). Measured values were reported in μm.

Density of a Film or Layer

The density was determined from a test piece whereby a precise area of film (100 mm×100 mm) is cut and weighed on an analytical balance. An average film thickness was determined by taking nine thickness measurements allocated over the whole film surface. The density was calculated and reported in $[g/cm^3]$. Also an average yield in $m^2/kg$ and the unit weight in $g/m^2$ can be calculated from these values.

Brightness Ry Color values were measured using a Datacolor Elrepho spectrometer (Datacolor AG, Switzerland), Ry was measured according to DIN 53163 and CIELAB color differences L*, a* and b* were determined according to DIN 6174.

Gloss 60° (20°, 85°)

The gloss was measured at 60°, additionally also at 20° or 85° may be measured. All measurements were done according to ISO 2813 using a trigloss Glossmeter (Byk-Gardner GmbH, Germany).

Opacity

The opacity measurements were done according to DIN 53146 by measuring the whiteness of a film sample on a black and a white substrate using a Byk-Gardner Spectro-Guide (Byk-Gardner GmbH, Germany). The opacity is the contrast ratio of the two measurements. The units are percent % and a perfectly opaque material will have an opacity value of 100%.

Transmittance

Light Transmittance (transparency) is the ratio of total transmitted light to the amount of incident light. Light transmittance was measured using haze-guard plus (Byk Gardener, Germany) test equipment according to ASTM D1003.

Tensile Strength

The produced film samples were tested on their tensile behaviour on a Zwick/Roell Allround Z020 equipment (Zwick GmbH & Co. KG, Germany) according to ISO 527-3. Tensile testing was done on samples taken in machine direction (MD) and in transverse direction (TD). At least five samples are tested for each formulation and average values are calculated. Tensile modulus [MPa], tensile strength

[MPa], and elongation at break [%] are reported. The sample size of the film samples is 15 mm×170 mm and the testing length was 5 cm.

Maximum Elongation at Break

Elongation at break determination was performed according to ISO 527-3. The film specimen width was of 15 mm and the testing length was 5 cm.

Tensile E-Modulus (Modulus of Elasticity)

Tensile E-modulus determination was performed according to ISO 527-3. The film specimen width was of 15 mm and the testing length was 5 cm. The E-modulus corresponded to the inclination of the tensile test curve between the points at 0.02% and 2% elongation.

Water Vapor Transmission Rate (WVTR)

The WVTR value of the polyester films was measured with a Lyssy L80-5000 (PBI-Dansensor A/S, Denmark) measuring device according to ASTM E398.

2 MATERIALS

CC1 (inventive): Natural ground calcium carbonate, stone feed commercially available from Omya International AG, Switzerland ($d_{50}$: 0.8 µm; $d_{98}$: 3 µm, content of particles<0.5 µm=35%), surface-treated with 1.7 wt.-% stearic acid (commercially available from Sigma-Aldrich, Croda) based on the total weight of the natural ground calcium carbonate. BET: 8.5 m2/g.

CC2 (inventive): Natural ground calcium carbonate, stone feed commercially available from Omya International AG, Switzerland ($d_{50}$: 1.7 µm; $d_{98}$: 6 µm, content of particles<0.5 µm=12%), surface-treated with 0.7 wt. % alkenyl succinic anhydride (CAS [68784-12-3], concentration>93%) based on the total weight of the natural ground calcium carbonate. BET: 3.4 m$^2$/g.

CC3 (comparative): Natural ground calcium carbonate, stone feed commercially available from Omya International AG, Switzerland ($d_{50}$: 3 µm; $d_{98}$: 12.5 µm, content of particles<2 µm=33%), surface-treated with 0.5 wt. % alkenyl succinic anhydride (CAS [68784-12-3], concentration>93%) based on the total weight of the natural ground calcium carbonate. BET: 2 m$^2$/g.

CC4 (comparative): Natural ground calcium carbonate, stone feed commercially available from Omya International AG, Switzerland ($d_{50}$: 6.5 µm; $d_{98}$: 32 µm, content of particles<2 µm=20%), surface-treated with 0.4 wt.-% stearic acid (commercially available from Sigma-Aldrich, Croda) based on the total weight of the natural ground calcium carbonate. BET: 1 m$^2$/g.

CC5 (comparative): Natural ground calcium carbonate, stone feed commercially available from Omya International AG, Switzerland ($d_{50}$: 0.8 µm; $d_{98}$: 3 µm, content of particles<0.5 µm=35%), surface-treated with 2.4 wt.-% stearic acid (commercially available from Sigma-Aldrich, Croda) based on the total weight of the natural ground calcium carbonate. BET: 8.5 m$^2$/g.

CC6 (inventive): Natural ground calcium carbonate, stone feed commercially available from Omya International AG, Switzerland ($d_{50}$: 0.8 µm; $d_{98}$: 3 µm, content of particles<0.5 µm=35%), surface-treated with 1.7 wt.-% alkenyl succinic anhydride (CAS [68784-12-3], concentration>93%) based on the total weight of the natural ground calcium carbonate. BET: 8.5 m$^2$/g.

The surface-treatment of CC1 to CC6 has been carried out by using the methods described in EP 2 722 368 A1.

CMB1: White masterbatch for PET, SUKANO® T cc S528, commercially available from Sukano AG, Switzerland, 50% barium sulfate in PET.

CMB2: White masterbatch for PET, SUKANO® T cc S204, commercially available from Sukano AG, Switzerland, 65% titanium dioxide in PET.

CMB3: Optical brightener masterbatch for PET, SUKANO® T ob 5354-OB, commercially available from Sukano AG, Switzerland.

P1: Polyethylene terephthalate (PET), Plastiverd Global PET, commercially available from PLASTIVERD, PET Reciclado, SA, El Prat del Llobregat, Spain (intrinsic viscosity: 0.78 to 0.82 dl/g, crystalline polymer, according to the technical data sheet).

P2: Polypropylene homopolymer Polypropylene PPH 3060 ($MFR_2$: 1.8 g/10 min (230° C., 2.16 kg), density: 0.905 g/cm3 (according to technical data sheet), commercially available from Total Petrochemicals.

3 EXAMPLES

Example 1

Preparation of Masterbatches

Masterbatches containing P1 and one of the calcium carbonate fillers CC1 to CC6 were prepared on a lab scale Twin screw extruder (ZSE27HP-40D from Leistritz, Germany). The polymer PET was pre-dried prior to processing in an oven at 90° C. for 6 hours. The compositions and filler contents of the prepared masterbatches are compiled in Table 1 below. The precise filler content was determined by the ash content.

TABLE 1

Composition and filler content of prepared masterbatches.

| Masterbatch | Filler | Filler content [wt.-%] | Ash content [wt.-%] | Mineral dispersion quality |
|---|---|---|---|---|
| MB1 (inventive) | CC1 | 45 | 37.4 | good |
| MB2 (inventive) | CC2 | 45 | 39.3 | good |
| MB3 (comparative) | CC3 | 45 | 39.3 | low |
| MB4 (comparative) | CC4 | 45 | 39.8 | low |
| MB5 (comparative) | CC5 | 45 | 39.5 | low |
| MB6 (inventive) | CC6 | 45 | 40.1 | good |

The results shown in Table 1 confirm that masterbatches with good quality and MB1, MB2 and MB6 with good dispersion of the mineral in the polymer were produced.

Example 2

Preparation of Polyester Cast Films

Cast films were prepared on a Collin Laboratory Film Line (Dr. Collin GmbH, Germany) with a twin screw extruder with a diameter of 30 mm wide T-die and a take-up system, which had temperature controlled chill-rolls. The chilled roll was kept 20 mm from the T-die to produce a polyester sheet having a thickness of around 500 µm. The extruder and die temperatures were consistent throughout the experiment. The die temperature was set at 270° C.; the line speed was 0.5 m/min. The masterbatch or polymer was mixed with the neat, predried polymer P1 to receive cast films with the concentrations given in table 2.

TABLE 2

Compositions and properties of prepared cast films

| Film Sample | Masterbatch or polymer | Filler content [wt.-%] | Film thickness [μm] | Ash content [wt.-%] |
|---|---|---|---|---|
| 1 (comp.) | no | 0 | 503 | 0 |
| 2 (comp.) | P2 | 10 | 478 | 0 |
| 3 (comp.) | CMB1 | 18 | 563 | 17.7 |
| 4 (comp.) | CMB2 | 7.4 | 543 | 7.9 |
| 5 (inv.) | MB1 | 5 | 515 | 4.4 |
| 6 (inv.) | MB1 | 10 | 518 | 8 |
| 7 (inv.) | MB1 | 15 | 601 | 14.5 |
| 8 (inv.) | MB1 | 18 | 512 | 15.8 |
| 9 (inv.) | MB2 | 5 | 491 | 4.4 |
| 10 (inv.) | MB2 | 10 | 512 | 8.8 |
| 11 (inv.) | MB2 | 15 | 557 | 14.7 |
| 12 (inv.) | MB2 | 18 | 533 | 16.7 |
| 13 (inv.) | MB6 | 5 | 499 | 4.4 |
| 14 (inv.) | MB6 | 10 | 502 | 8.8 |
| 15 (inv.) | MB6 | 15 | 569 | 14.5 |
| 16 (inv.) | MB6 | 18 | 473 | 17.9 |
| 17 (inv.) | MB6 CMB2 | 15 1.2 | 631 | 15.9 |
| 18 (inv.) | MB6 CMB3 | 15 1 | 540 | 12.8 |

All films shown in Table 2 are cast films which were produced in good quality with visual good appearance.

Example 3

Preparation of Biaxially Stretched Polyester Films

A biaxial lab stretcher (Model Maxi Grip 750S Bi-axial Laboratory Stretching Frame, from Dr. Collin GmbH, Germany) was used to stretch the cast films. The cast film with dimensions of 135 mm×135 mm and a film thickness of around 500 μm (exact values given in Table 2) was gripped by 9×9 clips and heated by the infrared system up to 90° C. measured on the cast film surface. The preheat time before drawing was fixed at 2 min., then the film was stretched by simultaneously biaxially stretching to the final stretch ratio with an acceleration of 6 000 mm/s²×6 000 mm/s² resulting in speed of 345 mm/s×345 mm/s. After being stretched to the final dimensions, the film was immediately air cooled to room temperature by a fan and then was removed from the stretcher. Films were drawn to the target draw ratio of 3.3×3.3 (230%×230%). The stretching ratio and temperatures were kept constant for all samples.

The physical, optical and barrier properties of the obtained oriented films are outlined in table 3.

The mechanical properties, such as the tensile strength at break, E-modulus as well as the elongation at break in machine (MD) and transverse (TD) direction, of the obtained oriented films are outlined in table 4.

The results shown in tables 3 and 4 confirm that the inventive oriented polyester films have a good quality, a reduced density and a high opacity. The inventive films have also a high degree of whiteness, good barrier properties and good mechanical properties.

By comparing the results shown in table 3, the film sample 3 (comparative, containing 18% CMB1) to the film sample 8 (inventive, 18% MB1), film sample 12 (inventive, 18% MB2) and film sample 16 (inventive, 18% MB6), all oriented films contain the same amount (filler content) of the voiding agent. The density of the inventive films (film samples 8, 12 and 16) is reduced to 1.19 to 1.23 g/cm³, whereas the density of the comparative film (film sample 3) is 1.38 g/cm³. These films even so the voiding is much more pronounced, shown in the reduced density, a high opacity and low light transmission. The opacity of the inventive films (film samples 8, 12 and 16) is between 92 and 97%, which is comparable or better than the opacity of the comparative film (film sample 3) with 92%.

By comparing the results shown in table 3, the film sample 2 (comparative, containing 10% CMB1) to the film sample 6 (inventive, 10% MB1), film sample 10 (inventive, 10% MB2) and film sample 14 (inventive, 10% MB6), all oriented films contain the same amount (filler content) of the voiding agent. The density of the inventive films (film samples 6, 10 and 14) is from 1.26 to 1.32 g/cm³, whereas the density of the comparative film (film sample 2) is 1.29 g/cm³, this means on the same level. The opacity of the inventive films (film samples 6, 10 and 14) is between 82 and 89%, which is much higher than the opacity of the comparative film (film sample 2) with only 44%.

TABLE 3

Physical, optical and barrier properties of prepared biaxially stretched polyester films

| Sample | Film thickness [μm] | Density [g/cm³] | Opacity [%] | Transmission [%] | Gloss 60° First side [GU]# | Gloss 60° Second side [GU]# | Brightness Ry [%] | CIE Lab L* [—] | WVTR [g/(m²·day)] |
|---|---|---|---|---|---|---|---|---|---|
| 1 (comp.) | 47 | 1.35 | 16 | 91 | 213 | 214 | 46 | 73 | 59 |
| 2 (comp.) | 48 | 1.29 | 44 | 66 | 111 | 120 | 51 | 77 | 46 |
| 3 (comp.) | 52 | 1.38 | 92 | 19 | 18 | 21 | 88 | 95 | 62 |
| 4 (comp.) | 52 | 1.36 | 86 | 27 | 77 | 88 | 81 | 92 | 57 |
| 5 (inv.) | 51 | 1.32 | 68 | 52 | 46 | 57 | 74 | 89 | 61 |
| 6 (inv.) | 54 | 1.32 | 85 | 29 | 31 | 38 | 80 | 92 | 62 |
| 7 (inv.) | 61 | 1.31 | 93 | 17 | 31 | 50 | 84 | 93 | 58 |
| 8 (inv.) | 59 | 1.23 | 95 | 13 | 20 | 32 | 89 | 95 | 60 |
| 9 (inv.) | 53 | 1.30 | 63 | 53 | 28 | 30 | 72 | 88 | 63 |
| 10 (inv.) | 53 | 1.27 | 82 | 34 | 17 | 20 | 80 | 91 | 57 |
| 11 (inv.) | 69 | 1.21 | 92 | 20 | 14 | 22 | 84 | 94 | 52 |
| 12 (inv.) | 61 | 1.20 | 92 | 19 | 14 | 20 | 84 | 94 | 56 |
| 13 (inv.) | 52 | 1.32 | 72 | 45 | 60 | 71 | 74 | 89 | 61 |
| 14 (inv.) | 54 | 1.26 | 89 | 25 | 36 | 40 | 83 | 93 | 58 |
| 15 (inv.) | 67 | 1.23 | 95 | 14 | 24 | 28 | 88 | 95 | 58 |
| 16 (inv.) | 62 | 1.19 | 97 | 12 | 20 | 24 | 90 | 96 | 60 |
| 17 (inv.) | 63 | 1.23 | 94 | 13 | 30 | 53 | 87 | 95 | 56 |
| 18 (inv.) | 65 | 1.21 | 96 | 14 | 26 | 36 | 89 | 95 | 61 | gloss units

TABLE 4

Mechanical properties of prepared biaxially stretched polyester films: Film samples taken in machine direction (MD) and in transverse direction (TD).

| Sample | Tensile strength [MPa] - MD | E-modulus [MPa] - MD | Max. Elongation at break [%] - MD | Tensile strength [MPa] - TD | E-modulus [MPa] - TD | Max. Elongation at break [%] - TD |
|---|---|---|---|---|---|---|
| 1 (comp.) | 184 | 3 900 | 57 | 179 | 4 300 | 55 |
| 2 (comp.) | 165 | 3 600 | 71 | 146 | 3 500 | 60 |
| 3 (comp.) | 143 | 3 300 | 51 | 139 | 3 500 | 56 |
| 4 (comp.) | 163 | 3 600 | 68 | 158 | 3 600 | 68 |
| 5 (inv.) | 156 | 3 500 | 50 | 149 | 3 100 | 63 |
| 6 (inv.) | 149 | 3 100 | 53 | 137 | 3 200 | 63 |
| 7 (inv.) | 138 | 3 200 | 66 | 133 | 3 300 | 68 |
| 8 (inv.) | 119 | 3 100 | 55 | 115 | 3 000 | 53 |
| 9 (inv.) | 177 | 3 700 | 66 | 154 | 3 600 | 68 |
| 10 (inv.) | 155 | 3 300 | 57 | 153 | 3 400 | 66 |
| 11 (inv.) | 124 | 3 000 | 59 | 131 | 3 000 | 71 |
| 12 (inv.) | 124 | 2 900 | 61 | 117 | 2 900 | 60 |
| 13 (inv.) | 167 | 3 800 | 56 | 158 | 3 500 | 62 |
| 14 (inv.) | 151 | 3 200 | 64 | 147 | 3 400 | 63 |
| 15 (inv.) | 130 | 3 000 | 60 | 142 | 3 200 | 69 |
| 16 (inv.) | 123 | 2 800 | 63 | 119 | 2 800 | 60 |
| 17 (inv.) | 142 | 3 100 | 63 | 137 | 3 100 | 61 |
| 18 (inv.) | 133 | 3 100 | 63 | 121 | 2 900 | 56 |

The invention claimed is:

1. A mono or multi-layer biaxially oriented polyester film, comprising at least one layer of the film comprising at least one polyester in an amount ranging from 70 wt.-% to 99.9 wt.-% and a surface-treated filler material product in an amount ranging from 0.1 wt.-% to 30 wt.-%, based on the total weight of the layer, wherein the surface-treated filler material product comprises:
   A) at least one ground calcium carbonate-comprising filler material having a weight median particle size $d_{50}$ in the range from 0.5 μm to 2.5 μm, and
   B) a treatment layer on the surface of the at least one ground calcium carbonate-comprising filler material, wherein the treatment layer comprises:
      i. at least one aliphatic aldehyde and/or salty reaction product thereof, and/or
      ii. at least one mono-substituted succinic anhydride and/or salty reaction product thereof, wherein the mono-substituted succinic anhydride consists of succinic anhydride mono-substituted with a substituent selected from the group consisting of a linear, branched, aliphatic and cyclic group having a total amount of carbon atoms from at least $C_2$ to $C_{30}$ in the substituent, and/or
      iii. at least one polydialkylsiloxane, and/or
      iv. mixtures of the materials according to i. to iii.,
   wherein the surface-treated filler material product comprises the treatment layer in an amount of from 0.1 wt.-% to 2.3 wt.-%, based on the total dry weight of the at least one ground calcium carbonate-comprising filler material.

2. The mono or multi-layer biaxially oriented polyester film of claim 1, wherein the at least one polyester and surface-treated filler material product comprising layer of the film comprises the surface-treated filler material product in an amount ranging from 1 wt.-% to 28 wt.-%, based on the total weight of the layer.

3. The mono or multi-layer biaxially oriented polyester film of claim 1, wherein the at least one polyester is selected from the group consisting of polyglycolic acid (PGA), polylactic acid (PLA), polycaprolactone (PCL), polyhydroxybutyrate (PHB), polyethylene terephthalate (PET), polybutylene terephthalate (PBT), polytrimethylene terephthalate (PTT), polyethylene naphthalate (PEN), polyethylene furanoate (PEF), bio-based polyesters, PET recycling materials and mixtures thereof.

4. The mono or multi-layer biaxially oriented polyester film of claim 1, wherein the at least one polyester and surface-treated filler material product comprising layer of the film comprises the at least one polyester in an amount ranging from 80 wt.-% to 99.9 wt.-%, based on the total weight of the layer.

5. The mono or multi-layer biaxially oriented polyester film of claim 1, wherein the at least one ground calcium carbonate-comprising filler material is a wet or dry ground calcium carbonate-comprising filler material and optionally is a wet ground calcium carbonate-comprising filler.

6. The mono or multi-layer biaxially oriented polyester film of claim 1, wherein the at least one ground calcium carbonate-comprising filler material is natural ground calcium carbonate, precipitated calcium carbonate, modified calcium carbonate, surface-treated calcium carbonate, or a mixture thereof.

7. The mono or multi-layer biaxially oriented polyester film of claim 1, wherein the at least one ground calcium carbonate-comprising filler material has
   a) a weight median particle size $d_{50}$ from 0.5 μm to 2 μm, and/or
   b) a top cut particle size $d_{98}$ of 15 μm, and/or
   c) a fineness such that at least 15 wt.-% of all particles have a particle size of <0.5 μm, and/or
   d) a specific surface area (BET) of from 0.5 m²/g to 150 m²/g, as measured using nitrogen and the BET method according to ISO 9277.

8. The mono or multi-layer biaxially oriented polyester film of claim 1, wherein the treatment layer on the surface of the at least one ground calcium carbonate-comprising filler material comprises at least one aliphatic aldehyde and/or salty reaction product thereof.

9. The mono or multi-layer biaxially oriented polyester film of claim 1, wherein the surface-treated filler material product comprises the treatment layer in an amount of from 0.2 wt.-% to 2.0 wt.-%, based on the total dry weight of the at least one ground calcium carbonate-comprising filler material.

10. The mono or multi-layer biaxially oriented polyester film of claim 1, wherein the at least one polyester and surface-treated filler material product comprising layer of the film further comprises a thermoplastic polymer, which is dispersed in the at least one polyester.

11. The mono or multi-layer biaxially oriented polyester film of claim 10, wherein the at least one polyester and surface-treated filler material product comprising layer of the film comprises the thermoplastic polymer in an amount ranging from 0.1 wt.-% to 29.9 wt.-%, based on the total weight of the layer.

12. The mono or multi-layer biaxially oriented polyester film of claim 1, wherein the film has
   a) a density in the range from 0.8 g/cm$^3$ to 1.4 g/cm$^3$, and/or
   b) an opacity of 50%.

13. The mono or multi-layer biaxially oriented polyester film of claim 1, wherein the at least one polyester and surface-treated filler material product comprising layer of the film further comprises an inorganic filler material different from the surface-treated filler material product.

14. The mono or multi-layer biaxially oriented polyester film of claim 1, wherein the film comprises an additive selected from the group consisting of light stabilizers.

15. A process for producing a mono or multi-layer biaxially oriented polyester film, the process comprising the steps of:
   a) providing a composition comprising at least one polyester and a surface-treated filler material product,
   b) forming a film from the composition of step a), and
   c) stretching the film obtained in step b) in machine direction (MD) and transverse direction (TD) in any order, wherein the stretching in machine direction (MD) and transverse direction (TD) is carried out sequentially or simultaneously,
wherein the surface-treated filler material product comprises:
   A) at least one ground calcium carbonate-comprising filler material having a weight median particle size $d_{50}$ in the range from 0.5 µm to 2.5 µm, and
   B) a treatment layer on the surface of the at least one ground calcium carbonate-comprising filler material, wherein the treatment layer comprises:
      i. at least one aliphatic aldehyde and/or salty reaction product thereof, and/or
      ii. at least one mono-substituted succinic anhydride and/or salty reaction product thereof, wherein the mono-substituted succinic anhydride consists of succinic anhydride mono-substituted with a substituent selected from a linear, branched, aliphatic and cyclic group having a total amount of carbon atoms from at least $C_2$ to $C_{30}$ in the substituent, and/or
      iii. at least one polydialkylsiloxane, and/or
      iv. mixtures of the materials according to i. to iii., wherein the surface-treated filler material product comprises the treatment layer in an amount of from 0.1 wt.-% to 2.3 wt.-%, based on the total dry weight of the at least one ground calcium carbonate-comprising filler material.

16. The process of claim 15, wherein the composition provided in step a) is a masterbatch obtained by mixing and/or kneading the at least one polyester and the surface-treated filler material product to form a mixture and continuously pelletizing the obtained mixture.

17. The process of claim 15, wherein the composition provided in step a) is a masterbatch having a filter pressure value in the range selected from the group consisting of from 0.01 bar/g to 0.5 bar/g, from 0.01 bar/g to 0.15 bar/g, and from 0.01 bar/g to 0.1 bar/g.

18. The process of claim 15, wherein the composition provided in step a) is a compound obtained by mixing and/or kneading the at least one polyester and the surface-treated filler material product to form a mixture and continuously pelletizing the obtained mixture.

19. The process of claim 15, wherein the composition provided in step a) is a compound having a filter pressure value in a range selected from the group consisting of 0.01 bar/g to 0.5 bar/g, 0.01 bar/g to 0.15 bar/g, and from 0.01 bar/g to 0.1 bar/g.

20. The process of claim 16 wherein the composition provided in step a) is a masterbatch comprising the surface-treated filler material product in an amount selected from the group consisting of >30 wt.-% to 85 wt.-%, >35 wt.-% to 80 wt.-% and >40 wt.-% to 70 wt.-%, based on the total weight of the masterbatch.

21. The process of claim 16, wherein process steps a) and b) are carried out simultaneously, optionally in that the at least one polyester and the surface-treated filler material product are added directly into an extruder to carry out step b).

22. The process of claim 18, wherein process steps a) and b) are carried out simultaneously, optionally in that the at least one polyester and the surface-treated filler material product are added directly into an extruder to carry out step b).

23. The process of claim 16, wherein the composition comprising at least one polyester and a surface-treated filler material product of step a) is obtained by adding the surface-treated filler material product, optionally before or after, to the polycondensation process of the at least one polyester.

24. The process of claim 18, wherein the composition comprising at least one polyester and a surface-treated filler material product of step a) is obtained by adding the surface-treated filler material product, optionally before or after, to the polycondensation process of the at least one polyester.

25. A method of providing a voiding agent in a mono or multi-layer biaxially oriented polyester film, wherein the voiding agent comprises a surface-treated filler material product comprising:
   A) at least one ground calcium carbonate-comprising filler material having a weight median particle size $d_{50}$ in the range from 0.5 µm to 2.5 µm, and
   B) a treatment layer on the surface of the at least one ground calcium carbonate-comprising filler material, wherein the treatment layer comprises:
      i. at least one aliphatic aldehyde and/or salty reaction product thereof, and/or
      ii. at least one mono-substituted succinic anhydride and/or salty reaction product thereof, wherein the mono-substituted succinic anhydride consists of succinic anhydride mono-substituted with a substituent selected from a linear, branched, aliphatic or cyclic group having a total amount of carbon atoms from at least $C_2$ to $C_{30}$ in the substituent, and/or
      iii. at least one polydialkylsiloxane, and/or
      iv. mixtures of the materials according to i. to iii., wherein the surface-treated filler material product comprises the treatment layer in an amount of from 0.1 wt.-% to 2.3 wt.-%, based on the total dry weight of the at least one ground calcium carbonate-comprising filler material.

26. An article comprising a mono or multi-layer biaxially oriented polyester film according to claim 1, wherein the article is selected from the group consisting of packaging products, food contact articles, paper coverings, glass coverings, insulating materials, solar articles, electronic articles, acoustic articles, flexible circuits, graphic arts articles, filter products, cosmetic products, household products, imaging and recording media, X-ray films, thermal transfer imaging products, industrial products, release sheets, fiberglass panels, laminating films, hot staming foils, and insulation facing.

27. A method of preparing an article, the method comprising preparing the article by providing a mono or multi-layer biaxially oriented polyester film according to claim 1 in the article, wherein the article is selected from the group consisting of packaging products, food contact articles, paper coverings, glass coverings, insulating materials, solar articles, electronic articles, acoustic articles, flexible circuits, graphic arts articles, filter products, cosmetic products, household products, imaging and recording media, X-ray films, thermal transfer imaging products, industrial products, release sheets, fiberglass panels, laminating films, hot stamping foils and insulation facing.

28. The mono or multi-layer biaxially oriented polyester film of claim 1, wherein the treatment layer comprises the at least one mono-substituted succinic anhydride and/or salty reaction product thereof.

29. The mono or multi-layer biaxially oriented polyester film of claim 10, wherein the thermoplastic polymer is cross linked with a cross linking agent and/or is selected from the group consisting of a polyolefin, optionally selected from the group consisting of polypropylene, polyethylene, polybutylene, and mixtures thereof, a cyclic olefin copolymer (COC), a polyketone, a polysulphone, a fluoropolymer, a polyacetal, an ionomer, an acrylic resin, a polystyrene resin, a polyurethane, a polyamide, a polycarbonate, a polyacrylonitrile and a copolymerized resin and mixtures thereof.

30. The mono or multi-layer biaxially oriented polyester film of claim 13, wherein the inorganic filler material is selected firm the group consisting of alumina, silica, titanium dioxide, alkaline metal salts, optionally barium carbonate, calcium sulfate, barium sulfate and mixtures thereof, optionally in an amount of 1 wt.-% to 10 wt.-% based on the total weight of the layer.

31. The article of claim 26, wherein the article is selected from the group consisting of flexible packaging products, photovoltaic frontsheets, photovoltaic backsheets, marine articles, aviation articles, science articles, displays, wires, cables, radio frequency identification articles, labels, paper replacement articles, hologram articles, photographic papers, and capacitors.

32. The method of claim 27, wherein the article is selected from the group consisting of flexible packaging products, photovoltaic frontsheets, photovoltaic backsheets, marine articles, aviation articles, science articles, displays, wires, cables, radio frequency identification articles, labels, paper replacement articles, hologram articles, photographic papers, and capacitors.

33. The mono or multi-layer biaxially oriented polyester film of claim 1, wherein the treatment layer on the surface of the at least one ground calcium carbonate-comprising filler material comprises at least one polydialkylsiloxane.

* * * * *